(12) United States Patent
Lee et al.

(10) Patent No.: US 7,760,282 B2
(45) Date of Patent: Jul. 20, 2010

(54) LIQUID CRYSTAL DISPLAY

(75) Inventors: Seong-Young Lee, Anyang-si (KR);
Dong-Gyu Kim, Yongin-si (KR);
Hye-Seok Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 254 days.

(21) Appl. No.: 11/755,547

(22) Filed: May 30, 2007

(65) Prior Publication Data

US 2008/0002089 A1    Jan. 3, 2008

(30) Foreign Application Priority Data

May 30, 2006    (KR) ...................... 10-2006-0048630
May 15, 2007    (KR) ...................... 10-2007-0046984

(51) Int. Cl.
*G02F 1/1343* (2006.01)
*G02F 1/136* (2006.01)

(52) U.S. Cl. .............................. 349/48; 349/42; 349/43; 349/44; 349/46; 349/47; 349/143; 349/139

(58) Field of Classification Search .................. 349/48, 349/42, 43, 44, 46, 47, 56, 144, 143, 149, 349/152, 139
See application file for complete search history.

(56) References Cited

U.S. PATENT DOCUMENTS

| | | | |
|---|---|---|---|
| 2006/0033871 A1* | 2/2006 | Kim et al. | 349/139 |
| 2007/0109482 A1* | 5/2007 | Kim | 349/144 |
| 2007/0235735 A1* | 10/2007 | Kim et al. | 257/59 |
| 2008/0002089 A1* | 1/2008 | Lee et al. | 349/48 |
| 2008/0049160 A1* | 2/2008 | Kwon et al. | 349/48 |
| 2008/0074601 A1* | 3/2008 | Lee et al. | 349/144 |
| 2008/0252828 A1* | 10/2008 | Shin et al. | 349/106 |
| 2009/0213286 A1* | 8/2009 | Kim et al. | 349/39 |
| 2009/0310075 A1* | 12/2009 | Kim | 349/144 |

* cited by examiner

*Primary Examiner*—Brian M Healy
(74) *Attorney, Agent, or Firm*—Cantor Colburn LLP

(57) ABSTRACT

A liquid crystal display according to an exemplary embodiment of the present invention includes a pixel electrode having first and second sub-pixel electrodes; a first thin film transistor connected to the first sub-pixel electrode; a second thin film transistor connected to the second sub-pixel electrode; a first data line connected to the first thin film transistor; a second data line connected to the second thin film transistor; a gate line connected to the first and second thin film transistors and crossing the first and second data lines; and a blocking member overlapping at least one portion of the first sub-pixel electrode.

40 Claims, 22 Drawing Sheets

FIG.9

| | Normal alignment | | 3 Microns mis-alignment with left direction | | 3 Microns mis-alignment with right direction | |
|---|---|---|---|---|---|---|
| | A first sub-pixel | A second sub-pixel | A first sub-pixel | A second sub-pixel | A first sub-pixel | A second sub-pixel |
| Cst (fF) | 407 | | 407 | | 407 | |
| Clc (fF) | 413 | | 413 | | 413 | |
| Parasitic capacity pixel electrode a left data line (fF) | 1.25 | 1.34 | 1.52 | 1.61 | 1.06 | 1.15 |
| Parasitic capacity pixel electrode a light data line (fF) | 1.34 | 1.24 | 1.23 | 1.13 | 1.51 | 1.41 |

FIG.10

| | Normal alignment | | 3 Microns mis-alignment with left direction | | 3 Microns mis-alignment with right direction | |
|---|---|---|---|---|---|---|
| | A first sub-pixel | A second sub-pixel | A first sub-pixel | A second sub-pixel | A first sub-pixel | A second sub-pixel |
| Cst (fF) | 407 | | 407 | | 407 | |
| Clc (fF) | 413 | | 413 | | 413 | |
| Parasitic capacity pixel electrode a left data line (fF) | 0.529 | 0.617 | 0.63 | 0.72 | 0.49 | 0.59 |
| Parasitic capacity pixel electrode a light data line (fF) | 0.618 | 0.527 | 0.61 | 0.52 | 0.67 | 0.6 |

LIQUID CRYSTAL DISPLAY

CROSS-REFERENCE TO RELATED APPLICATION

This application claims priority to and the benefit of Korean Patent Application No. 10-2006-0048630 filed in the Korean Intellectual Property Office on May 30, 2006, and 10-2007-0046984 filed in the Korean Intellectual Property Office on May 15, 2007, the entire contents of which are incorporated herein by reference.

BACKGROUND OF THE INVENTION (a) Field of the Invention

The present invention relates to a liquid crystal display.

(b) Description of the Related Art

Liquid crystal displays (LCDs) are one of the most widely used flat panel displays, and an LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

An LCD also includes switching elements connected to the respective pixel electrodes and a plurality of signal lines such as gate lines and data lines for controlling the switching elements and thereby applying voltages to the pixel electrodes.

Various methods have been attempted for improving the motion picture display characteristics of LCDs, among which a high-speed drive method is under development. Since power consumption is large owing to a high frame speed in the high-speed driving method, column inversion among inversion driving methods is employed to minimize power consumption.

However, it is easy for parasitic capacitance to be generated between a data line and a pixel electrode in the LCDs. Further, differences of the parasitic capacitance are generated due to misalignments of data lines and pixel electrodes in the manufacturing process such that deviations of brightness are generated.

It is an object of the present invention to prevent the generation of deviations of the brightness due to the misalignment by reducing parasitic capacitance generated between the data lines and the pixel electrodes.

It is another object of the present invention to prevent the generation of texture by minimizing a distorted arrangement of liquid crystal molecules.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a liquid crystal display including a pixel electrode having first and second sub-pixel electrodes; a first thin film transistor connected to the first sub-pixel electrode; a second thin film transistor connected to the second sub-pixel electrode; a first data line connected to the first thin film transistor; a second data line connected to the second thin film transistor; a gate line connected to the first and second thin film transistors, and intersecting the first and second data lines; and a blocking member overlapping at least one portion of the first sub-pixel electrode.

The blocking member may be made of the same material as the gate line.

The liquid crystal display may further include a storage electrode line overlapping the pixel electrode, wherein the blocking member is extended from the storage electrode line.

The blocking member may include first and second blocking members extended in the same direction with respect to the storage electrode line and facing each other.

The voltage of the first sub-pixel electrode may be higher than the voltage of the second sub-pixel electrode.

The area of the first sub-pixel electrode may be smaller than the area of the second sub-pixel electrode.

The first and second thin film transistors may be turned on according to a signal of the gate line and may transmit the signals of the first and second data lines.

The blocking member may overlap the edge of the first sub-pixel electrode adjacent to the first and second data lines.

The blocking member may be substantially parallel to the first and second data lines.

The pixel electrode may have a first cutout including an oblique portion obliquely extended with respect to the gate line.

The liquid crystal display may further include a common electrode facing the pixel electrode, wherein the common electrode has a second cutout including an oblique portion obliquely extended with respect to the gate line.

The blocking member may overlap the second sub-pixel electrode.

An exemplary embodiment of the present invention provides a liquid crystal display including a gate line; a data line intersecting the gate line; a thin film transistor connected to the gate line and the data line; a pixel electrode connected to the thin film transistor; and a storage electrode line overlapping the pixel electrode, wherein the pixel electrode has at least one oblique side obliquely extended with respect to the gate line and the data line, and a central side overlapping the storage electrode line and neighboring the oblique side.

The central side may be substantially parallel to the data line.

The central side may overlap the storage electrode line.

The oblique side may include first and second oblique sides that are symmetrical with respect to the storage electrode line.

A concave portion may be formed between the oblique side and the central side.

An angle between the oblique side and the gate line or the data line may be about 45 degrees or 135 degrees.

The liquid crystal display may further include an electrode member overlapping the storage electrode line.

The electrode member may be connected to the pixel electrode.

The pixel electrode may include a first sub-pixel electrode and a second sub-pixel electrode separated from each other.

The voltage of the first sub-pixel electrode may be different from the voltage of the second sub-pixel electrode.

The area of the first sub-pixel electrode may be different from the area of the second sub-pixel electrode.

Different voltages of the first and second sub-pixel electrodes may be generated from one image data.

The liquid crystal display may further include a first thin film transistor connected to the first sub-pixel electrode, and a second thin film transistor connected to the second sub-pixel electrode.

The first and second thin film transistors may be connected to different gate lines or different data lines.

The liquid crystal display may further include an organic insulating layer formed between the pixel electrode and the data line.

BRIEF DESCRIPTION OF THE DRAWINGS

FIG. 9 is a table showing various parasitic capacitances in the cases of normal alignments and misalignments in a general LCD.

FIG. 10 is a table showing various parasitic capacitances in the cases of normal alignments and misalignments in an LCD according to an exemplary embodiment of the present invention.

DETAILED DESCRIPTION OF THE EMBODIMENTS

Figure 1:
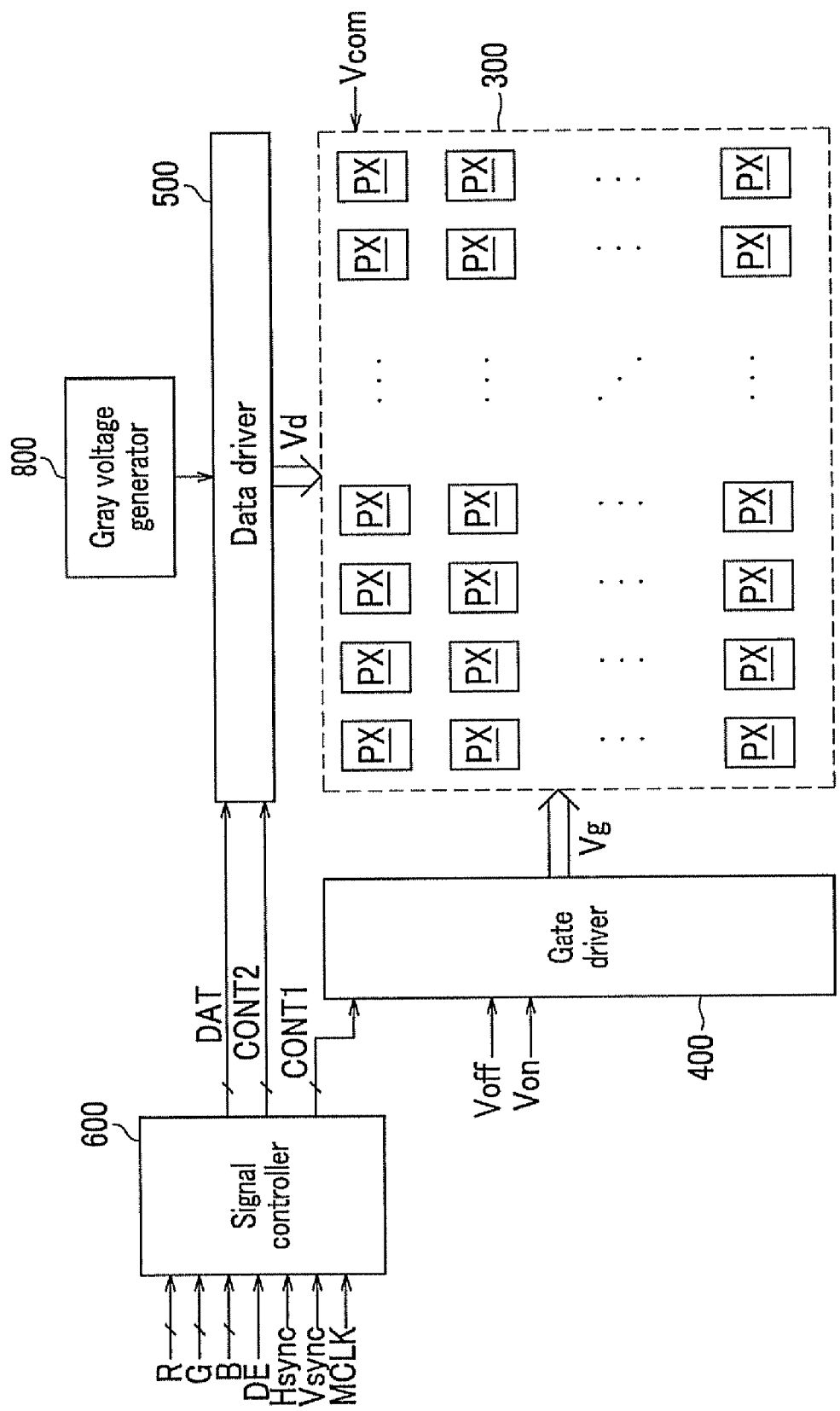
FIG. 1 is a block diagram of an LCD according to an exemplary embodiment of the present invention.

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, LCDs according to embodiments of the present invention will be described in detail with reference to the accompanying drawings.

Figure 2:
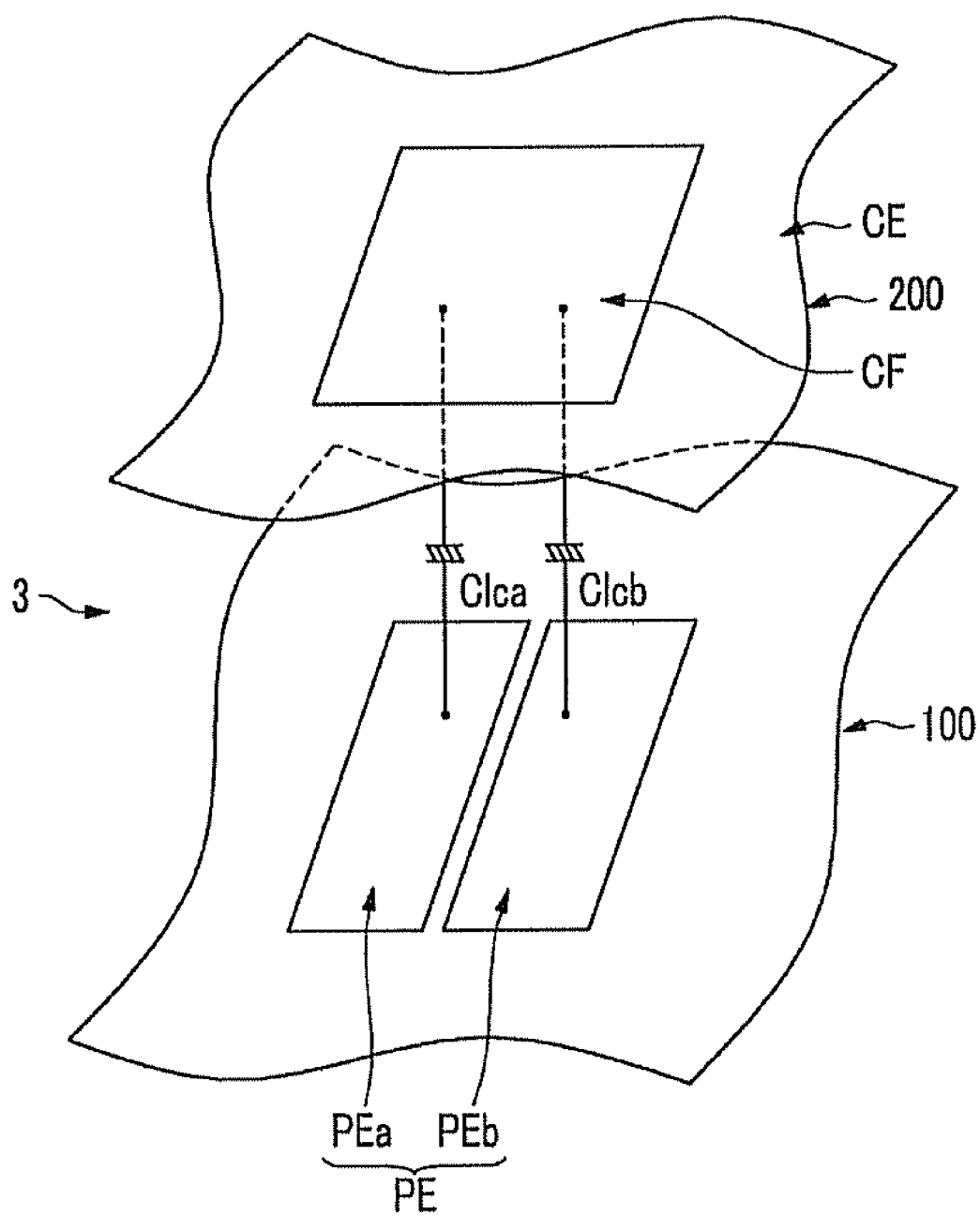
FIG. 2 is an equivalent circuit diagram of two sub-pixels of an LCD according to an exemplary embodiment of the present invention.

FIG. 1 is a block diagram of an LCD according to an exemplary embodiment of the present invention, and FIG. 2 is an equivalent circuit diagram of two sub-pixels of an LCD according to an exemplary embodiment of the present invention.

As shown in FIG. 1, an LCD according to an exemplary embodiment of the present invention includes an LC panel assembly 300, a gate driver 400 and a data driver 500 that are connected to the LC panel assembly 300, a gray voltage generator 800 connected to the data driver 500, and a signal controller 600 for controlling the above elements.

The LC panel assembly 300 includes a plurality of signal lines (not shown), and a plurality of pixels PX connected to the signal lines and arranged substantially in a matrix, as seen in the equivalent circuit diagram. The LC panel assembly 300 further includes lower and upper panels 100 and 200 that face each other and an LC layer 3 interposed therebetween, as in the structural view shown in FIG. 2.

The signal lines include a plurality of gate lines for transmitting gate signals (also referred to as "scanning signals") and a plurality of data lines for transmitting data signals. The gate lines extend substantially in a row direction and substantially parallel to each other, and the data lines extend substantially in a column direction and substantially parallel to each other. A data line is disposed on either side of a pixel PX.

Each pixel PX includes a pair of sub-pixels PEa and PEb. Each sub-pixel PEa and PEb includes a switching element (not shown) connected to the signal lines GL and DL, and an LC capacitor Clca or Clcb and a storage capacitor Csta or Cstb (see FIG. 3) that are connected to the switching element. The storage capacitors Csta and Cstb may be omitted as necessary.

The switching element including a thin film transistor is a three-terminal element provided on the lower panel 100, wherein the control terminal thereof is connected to the gate line GL, the input terminal thereof is connected to the data line DL, and the output terminal thereof is connected to an LC capacitor Clca or Clcb and a storage capacitor Csta or Cstb.

The LC capacitor Clca/Clcb includes a sub-pixel electrode PEa/PEb provided on the lower panel 100 and a common electrode CE provided on an upper panel 200 as two terminals, and the LC layer 3 disposed between the sub-pixel electrode PEa/PEb and the common electrode CE functions as a dielectric of the LC capacitor Clca/Clcb. Each of the pair of sub-pixel electrodes PEa and PEb are separated from each other and together form a pixel electrode PE. The common electrode CE is formed on the entire surface of the upper panel 200 and supplied with a common voltage Vcom. Unlike FIG. 2, the common electrode CE may be provided on the lower panel 100, and in this case, at least one of the two electrodes PE and CE may have a shape of a stripe or bar. The LC layer 3 has negative dielectric anisotropy, and the LC molecules in the LC layer 3 may be aligned such that their major axes are substantially perpendicular to the two panels in the absence of an electric field.

The storage capacitor Cst functioning as an auxiliary capacitor for the liquid crystal capacitor Clca and Clcb is formed by overlapping another signal line (not shown) provided on the lower panel 100 with a pixel electrode PE via an insulator disposed therebetween, and this signal line is supplied with a predetermined voltage such as a common voltage Vcom. Alternatively, the storage capacitor Cst may be formed by overlapping a pixel electrode PE with the previous gate line immediately above it via an insulator.

In order to implement color display, each pixel PX uniquely displays one primary color (spatial division) or each pixel PX sequentially displays the primary colors in turn (temporal division) such that the spatial or temporal sum of the primary colors is recognized as a desired color. An example of a set of primary colors includes red, green, and blue. FIG. 2 shows an example of spatial division in which each pixel PX includes a color filter CF representing one of the primary colors in an area of the upper panel 200 facing the pixel electrode PE. Unlike FIG. 2, the color filter CF may be provided on or under the pixel electrode PE provided on the lower panel 100.

Polarizers (not shown) are provided on the outer surface of the panels 100 and 200, and the polarization axes of the two polarizers may be perpendicular to each other. One of the two polarizers may be omitted when the LCD is a reflective LCD. In the case of perpendicular polarizers, incident light radiating into the LC layer 3 in the absence of an electric field cannot pass through the polarizer.

Referring to FIG. 1 again, the gray voltage generator 800 generates two sets of a plurality of gray voltages (or reference gray voltages) related to the transmittance of the pixels PX. However, the gray voltage generator 800 may generate only a given number of gray voltages (referred to as reference gray voltages) instead of generating all of the gray voltages. Gray voltages of one set have a positive value with respect to the common voltage Vcom, while gray voltages of the other set have a negative value with respect to the common voltage Vcom.

The gate driver 400 is connected to the gate lines of the LC panel assembly 300 and synthesizes a gate-on voltage Von and a gate-off voltage Voff to generate gate signals Vg, which are applied to the gate lines.

The data driver 500 is connected to the data lines of the LC panel assembly 300 and selects the gray voltages supplied from the gray voltage generator 800 and then applies a selected gray voltage to the data lines as a data signal.

The signal controller 600 controls the gate driver 400 and the data driver 500.

Each of the drivers 400, 500, 600, and 800 mentioned above may be directly mounted on the LC panel assembly 300 in the form of at least one integrated circuit (IC) chip, may be mounted on a flexible printed circuit film (not shown) in a tape carrier package (TCP) type that is attached to the LC panel assembly 300, or may be mounted on a separate printed circuit board (not shown). Alternatively, each of the drivers 400, 500, 600, and 800 may be integrated with the LC panel assembly 300. Also, the drivers 400, 500, 600, and 800 may be integrated into a single chip, and in this case, at least one thereof or at least one circuit element forming them may be located outside of the single chip.

Now, a structure of the LC panel assembly will be described in detail with reference to FIG. 3 to FIG. 8 along with FIG. 1 and FIG. 2 described above.

Figure 3:
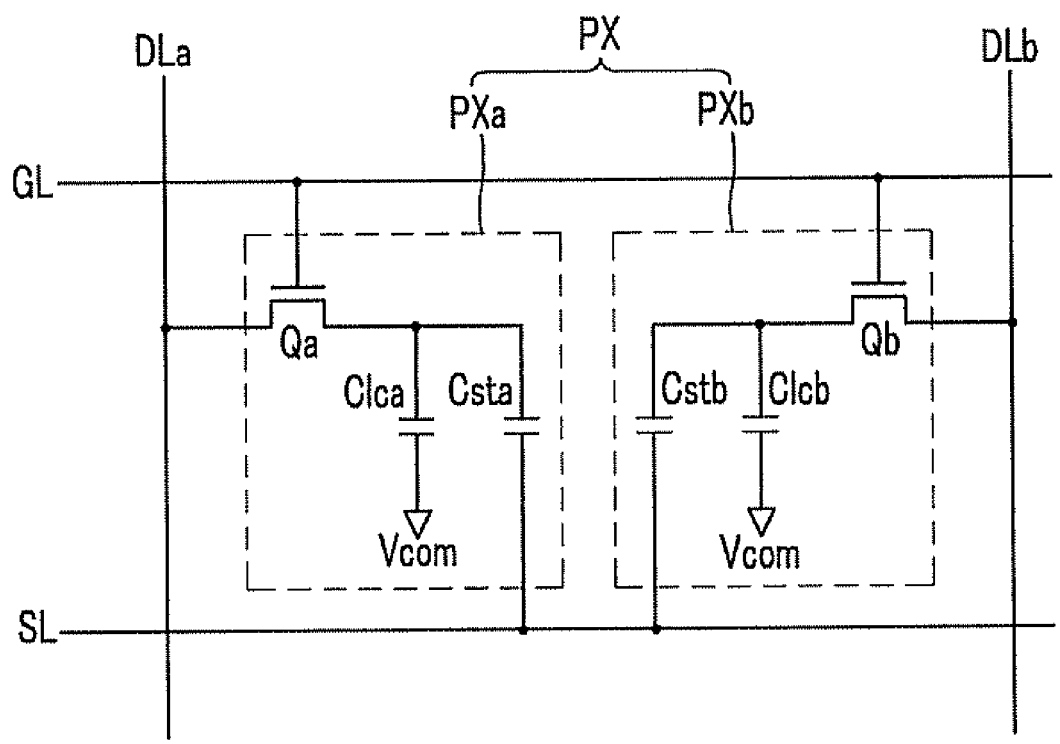
FIG. 3 is an equivalent circuit diagram of a pixel of an LC panel assembly according to an exemplary embodiment of the present invention.

FIG. 3 is an equivalent circuit diagram of a pixel of an LC panel assembly according to an exemplary embodiment of the present invention.

Referring to FIG. 3, an LCD panel assembly according to the present embodiment includes signal lines including a plurality of gate lines GL, a plurality of pairs of data lines DLa and DLb, and a plurality of storage electrode lines SL with a plurality of pixels PX connected to the signal lines.

Each pixel PX includes a pair of sub-pixels PXa and PXb, and each sub-pixel PXa/PXb includes a switching element Qa/Qb that is respectively connected to the corresponding gate line GL and a data line DLa/DLb, an LC capacitor Clca/Clcb that is connected to the switching element Qa/Qb, and a storage capacitor Csta/Cstb that is connected to the switching element Qa/Qb and the storage electrode line SL.

Each switching element Qa/Qb including a thin film transistor (TFT) is a three-terminal element provided on the lower panel 100, and it has a control terminal connected to a gate line GL, an input terminal connected to a data line DLa/DLb, and an output terminal connected to an LC capacitor Clca/Clcb and a storage capacitor Csta/Cstb.

The storage capacitor Csta/Cstb functioning as an auxiliary capacitor for the LC capacitor Clca/Clcb is formed by overlapping a storage electrode line SL that is provided on the lower panel 100 with a sub-pixel electrode PEa/PEb via an insulator disposed therebetween, and the storage electrode line SL is supplied with a predetermined voltage such as the common voltage Vcom. Alternatively, the storage capacitors Csta and Cstb may be formed by overlapping the sub-pixel electrodes PEa and PEb with a previous gate line immediately above via an insulator.

Here, detailed descriptions of the LC capacitors Clca and Clcb, which were previously described, will be omitted.

In an LCD including this LC panel assembly, the signal controller 600 may receive input image signals R, G, and B for a pixel PX and convert them into output image signals DAT for two sub-pixels PXa and PXb, which are transmitted to the data driver 500. Otherwise, the gray voltage generator 800 generates separate groups of gray voltages for two sub-pixels PXa and PXb. The two groups of gray voltages are alternately supplied by the gray voltage generator 800 to the data driver 500 or alternately selected by the data driver 500 such that the two sub-pixels PXa and PXb are supplied with different voltages.

At this time, the values of the converted output image signals and the values of the gray voltages in each group are preferably determined such that the synthesis of gamma curves for the two sub-pixels PXa and PXb approaches a reference gamma curve at a front view. For example, the synthesized gamma curve at a front view coincides with the most suitable reference gamma curve at a front view, and the synthesized gamma curve at a lateral view is the most similar to the reference gamma curve at a front view.

Now, an LC panel assembly shown in FIG. 3 will be described in detail with reference to FIG. 4 to FIG. 8.

Figure 4:
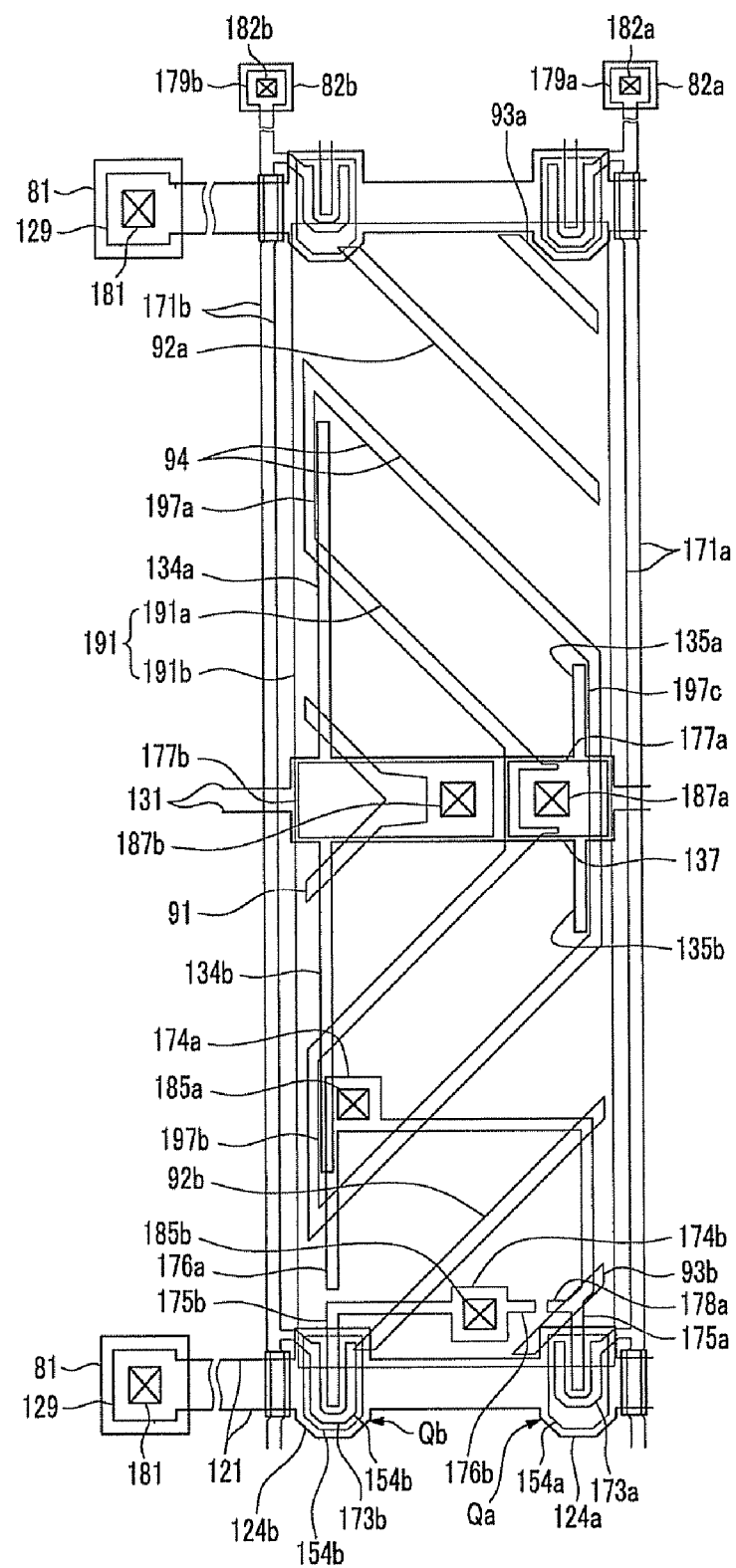
FIG. 4 is a layout view of a TFT array panel for a pixel of an LCD according to an exemplary embodiment of the present invention.
Figure 5:
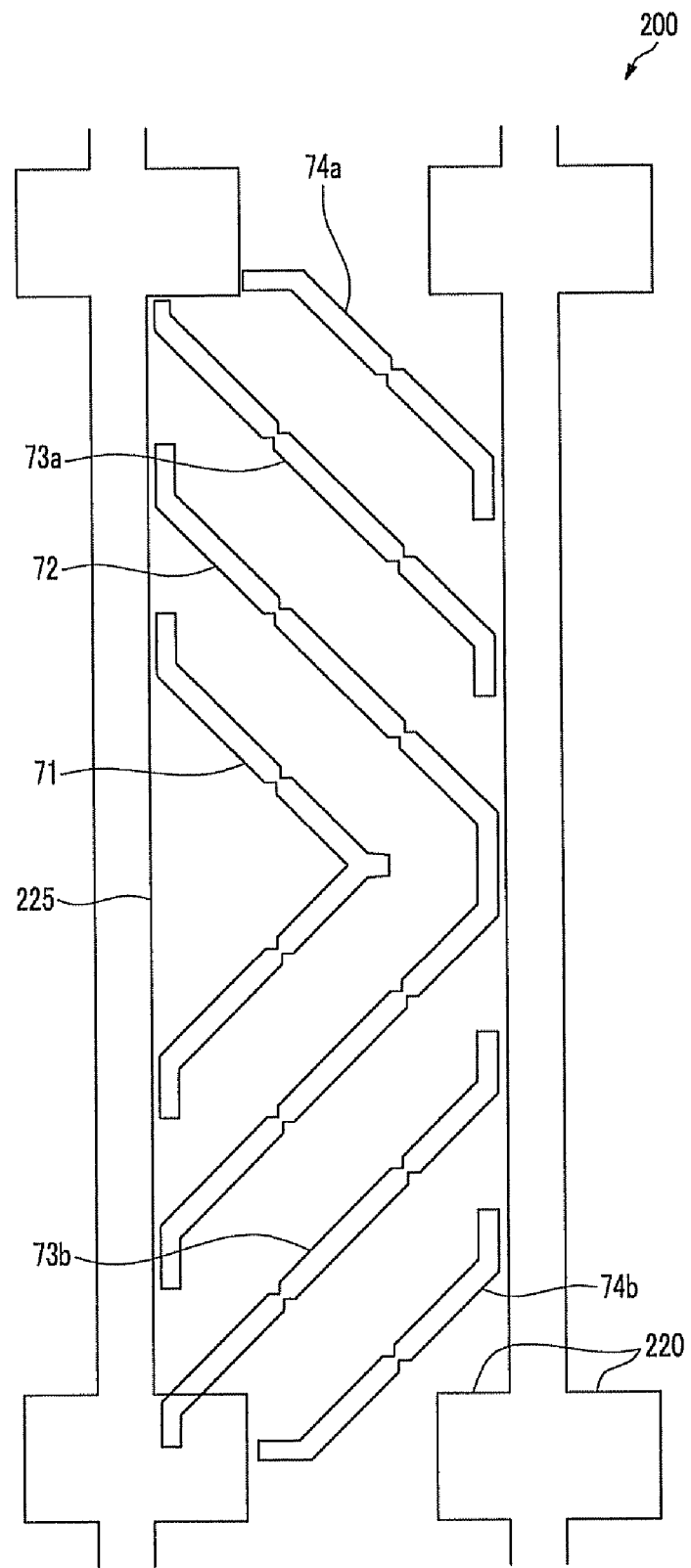
FIG. 5 is a layout view of a common electrode panel for a pixel of an LCD according to an exemplary embodiment of the present invention.
Figure 6:
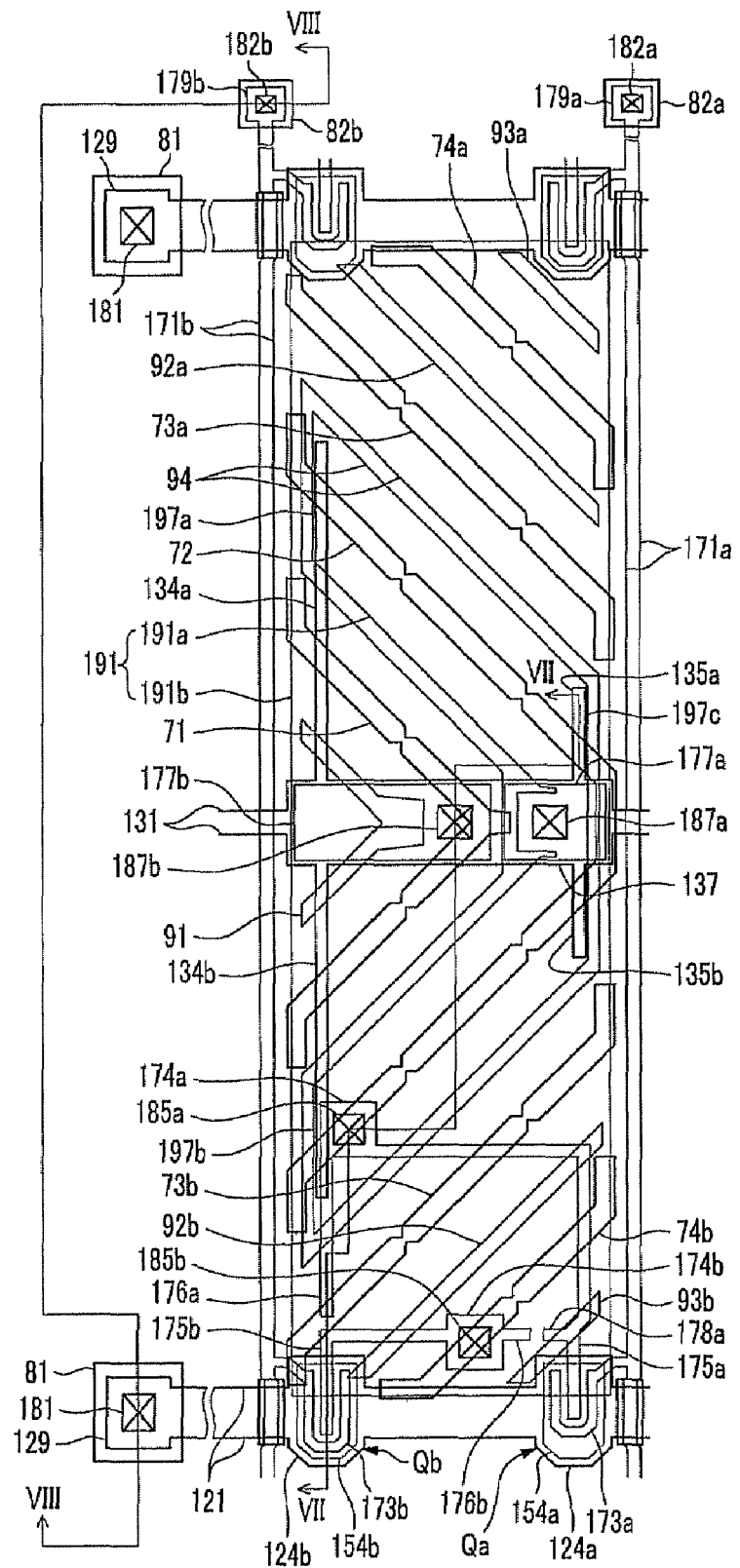
FIG. 6 is a layout view of an LCD including the TFT array panel shown in FIG. 4 and the common electrode panel shown in FIG. 5.
Figure 7:
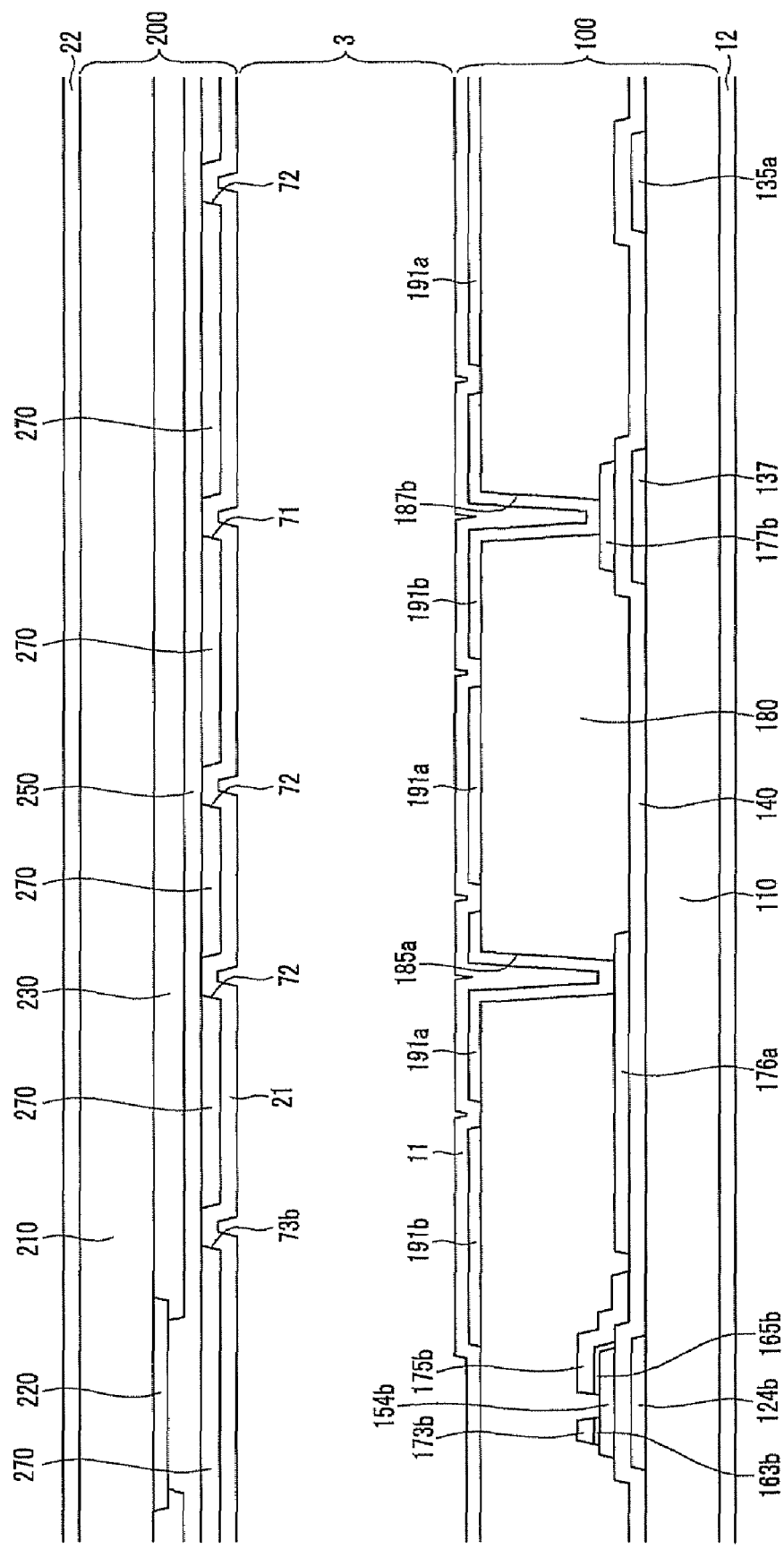
FIG. 7 and FIG. 8 are cross-sectional views of the LCD illustrated in FIG. 6 taken along the line VII-VII and the line VIII-VIII, respectively.
Figure 8:
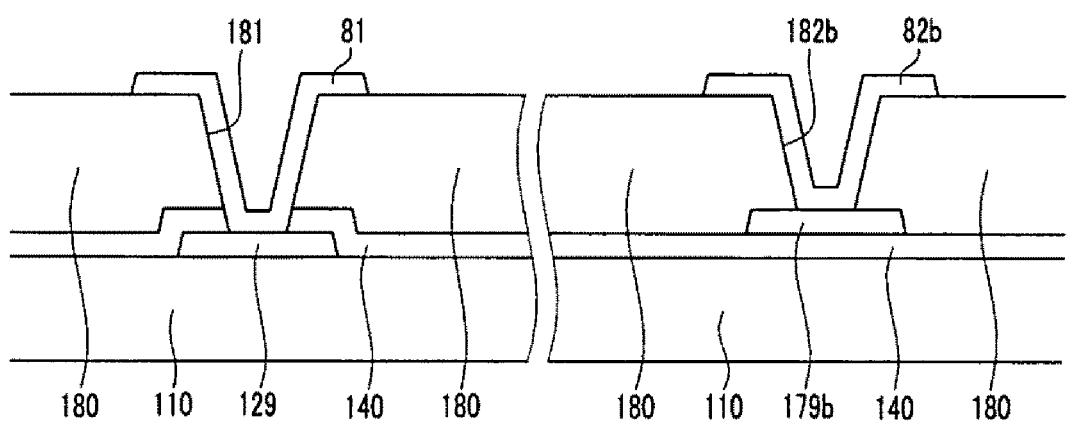

FIG. 4 is a layout view of a TFT array panel for a pixel of an LCD according to an exemplary embodiment of the present invention, FIG. 5 is a layout view of a common electrode panel for a pixel of an LCD according to an exemplary embodiment of the present invention, FIG. 6 is a layout view of an LCD including the TFT array panel shown in FIG. 4 and the common electrode panel shown in FIG. 5, and FIG. 7 and FIG. 8 are cross-sectional views of the LCD illustrated in FIG. 6 taken along the line VII-VII and the line VIII-VIII, respectively.

An LCD according to an exemplary embodiment of the present invention includes a lower panel 100 and an upper panel 200 opposing the lower panel 100, and an LC layer 3 interposed between the two panels 100 and 200.

First, the lower panel 100 will be described in detail with reference to FIG. 4, FIG. 6, FIG. 7, and FIG. 8.

A plurality of gate lines 121 and a plurality of storage electrode lines 131 are formed on an insulating substrate 110, which is preferably made of transparent glass.

The gate lines 121, which are separated from each other, extend substantially in a transverse direction and transmit gate signals. Each gate line 121 includes a plurality of projections forming a plurality of gate electrodes 124a and 124b and an end portion 129 having a large area for connection with another layer or an external driving circuit.

The storage electrode lines 131 extend substantially in a transverse direction and include a plurality of projections forming storage electrodes 137 and a plurality of first, second, third and fourth blocking members 134a, 134b, 135a, 135b, which are protruded upward or downward. The storage electrode lines 131 are supplied with a predetermined voltage, such as the common voltage Vcom that is applied to the common electrode 270 of the LCD.

The gate lines 121 and the storage electrode lines 131 may be made of an aluminum—(Al) containing metal such as Al and an Al alloy, a silver—(Ag) containing metal such as Ag and a Ag alloy, a copper—(Cu) containing metal such as Cu and a Cu alloy, a molybdenum—(Mo) containing metal such as Mo and a Mo alloy, chromium (Cr), tantalum (Ta), and titanium (Ti). Alternatively, the gate lines 121 and the storage electrode lines 131 may have a multi-layered structure including two conductive layers (not shown) having different physical properties. One of the two conductive layers is preferably made of a low resistivity metal, such as an Al-containing metal, a Ag-containing metal, or a Cu-containing metal, for reducing signal delay or voltage drop in the gate lines 121 and the storage electrode lines 131. The other conductive layer is preferably made of a material, such as a Mo-containing metal, Cr, Ti, and Ta, which has good contact characteristics with other materials such as indium tin oxide (ITO) and indium zinc oxide (IZO). Good examples of the combination of two layers include a pair of a lower Cr layer and an upper Al (alloy) layer and a pair of a lower Al (alloy) layer and an upper Mo (alloy) layer. However, the gate lines 121 and the storage electrode lines 131 may be made of many various metals or conductors besides the above.

Also, the lateral sides of the gate lines 121 and the storage electrode lines 131 are inclined relative to a surface of the substrate 110, and the preferable inclination angle thereof ranges from about 30 degrees to about 80 degrees.

A gate insulating layer 140 preferably made of silicon nitride (SiNx) is formed on the gate lines 121 and the storage electrode lines 131.

A plurality of semiconductor islands 154a and 154b preferably made of hydrogenated amorphous silicon (abbreviated to "a-Si") or polysilicon are formed on the gate insulating layer 140.

A plurality of ohmic contact islands 163b and 165b preferably made of silicide or n+ hydrogenated amorphous silicon (a-Si) heavily doped with an n-type impurity such as phosphorus (P) are formed on the semiconductors 154a and 154b. The ohmic contact islands 163b and 165b are disposed in pairs on the semiconductors 154a and 154b, respectively.

The lateral sides of the semiconductors 154a and 154b and the ohmic contacts 163b and 165b are also inclined relative to a surface of the substrate 110, and the preferable inclination angle thereof ranges from about 30 degrees to about 80 degrees.

A plurality of pairs of first and second data lines 171a and 171b, a plurality of pairs of first and second drain electrodes 175a and 175b, and a plurality of pairs of first and second electrode members 177a and 177b are formed on the ohmic contacts 163b and 165b and the gate insulating layer 140.

The data lines 171a and 171b extending substantially in the longitudinal direction intersect the gate lines 121 and the storage electrode lines 131 and transmit data signals. Each of the data lines 171a and 171b includes a plurality of source electrodes 173a and 173b branched out toward the gate electrodes 124a and 124b and an end portion 179a and 179b having an extended area for connection with another layer or an external driving circuit.

The drain electrodes 175a and 175b are separated from the data lines 171a and 171b, and the drain electrodes 175a and 175b oppose the source electrodes 173a and 173b with respect to the gate electrodes 124a and 124b, respectively.

Each of the first and second drain electrodes 175a and 175b includes a stick-shaped end portion, which is partially surrounded by the source electrode 173a and 173b curved in the shape of a letter "U".

Each first drain electrode 175a starts from the stick-shaped end portion to extend substantially parallel with the first data line 171a and then is curved vertically in a counterclockwise direction to extend parallel with the gate line 124, and the first drain electrode 175a includes an expansion 174a having a large area. Also, the first drain electrode 175a includes a branch 178a protruding vertically in a counterclockwise direction near the stick-shaped end portion, and an extension 176a formed by being curved vertically in a counterclockwise direction from the expansion 174a.

The second drain electrode 175b is curved vertically in a clockwise direction from the stick-shaped end portion to extend parallel with the gate line 124, and the second drain electrode 175b includes an expansion 174b having a large area and an extension 176b extending from the expansion 174b.

The first and second electrode members 177a and 177b are formed separately from the first and second drain electrodes 175a and 175b and overlap the storage electrode 137.

The first and second gate electrodes 124a and 124b, the first and second source electrodes 173a and 173b, and the first and second drain electrodes 175a and 175b, along with the semiconductors 154a and 154b, form the first and second TFTs Qa/Qb having a channel formed in the semiconductors 154a and 154b disposed between the first and second source electrodes 173a and 173b and the first and second drain electrodes 175a and 175b.

The data lines 171a and 171b, the drain electrodes 175a and 175b, and the first and second electrode members 177a and 177b are preferably made of a refractory metal such as Mo, Cr, Ta, and Ti, or an alloy thereof. Also, the data lines 171a and 171b and the drain electrodes 175a and 175b may have a multi-layered structure including a refractory metal layer (not shown) and a conductive layer (not shown) having low resistivity. Examples of the multi-layered structure include double layers of a lower Cr or Mo (alloy) layer and an upper Al (alloy) layer, and triple layers of a lower Mo (alloy) layer, an intermediate Al (alloy) layer, and an upper Mo (alloy) layer. However, the data lines 171a and 171b, the drain electrodes 175a and 175b, and the first and second electrode members 177a and 177b may be made of many various metals or conductive materials besides the above.

The lateral sides of the data lines 171a and 171b, the drain electrodes 175a and 175b, and the first and second electrode members 177a and 177b are also inclined relative to a surface of the substrate 110 like the gate lines 121 and the storage electrode lines 131, and the inclination angles thereof are preferably in a range of about 30 degrees to about 80 degrees.

The ohmic contacts 165b are interposed only between the underlying semiconductors 154a and 154b and the overlying data lines 171a and 171b and drain electrodes 175a and 175b thereon, and reduce the contact resistance therebetween.

A passivation layer 180 is formed on the data lines 171a and 171b, the drain electrodes 175a and 175b, the first and second electrode members 177a and 177b, and the exposed portions of the semiconductors 154a and 154b. The passivation layer 180 is made of an inorganic insulator such as silicon nitride or silicon oxide, an organic insulator, or a low dielectric insulator. The organic insulator and the low dielectric insulator have dielectric constants preferably lower than 4.0, and examples of the low dielectric insulator are a-Si:C:O and a-Si:O:F formed by plasma enhanced chemical vapor deposition (PECVD). The passivation layer 180 may be made of an organic insulator having photosensitivity, and the surface thereof may be flat. However, the passivation layer 180 may have a double-layered structure including a lower inorganic layer and an upper organic layer in order to not harm the exposed portions of the semiconductors 154a and 154b and to make the most of the excellent insulating characteristics of an organic layer.

The passivation layer 180 has a plurality of contact holes 182a, 182b, 185a, and 185b, and 187a and 187b, respectively exposing the end portions 179a and 179b of the data lines 171a and 171b and the first and second electrode members 177a and 177b, and the passivation layer 180 and the gate insulating layer 140 have a plurality of contact holes 181 respectively exposing the end portions 129 of the gate lines 121.

A plurality of pixel electrodes 191 including first and second sub-pixel electrodes 191a and 191b, shielding electrodes (not shown), and a plurality of contact assistants 81, 82a, and 82b are formed on the passivation layer 180. These may be made of a transparent conductor such as ITO or IZO, or a reflective metal such as Al, Ag, Cr, or an alloy thereof.

The first and second sub-pixel electrodes 191a and 191b are physically and electrically connected to the first and second drain electrodes 175a and 175b through the contact holes 185a/185b and are supplied with a data voltage from the first and second drain electrodes 175a and 175b. Each of the pair of sub-pixel electrodes 191a and 191b are applied with different data voltages, which were preset for an input image signal, wherein the size of the data voltages may be set depending on the size and shape of the sub-pixel electrodes 191a and 191b. The area of the sub-pixel electrodes 191a and 191b may be different from each other. As an example, the second sub-pixel electrode 191b is supplied with a higher voltage than the first sub-pixel electrode 191a, and the area of the second sub-pixel electrode 191b is smaller than that of the first sub-pixel electrode 191a.

The sub-pixel electrodes 191a and 191b supplied with data voltages generate electric fields in cooperation with the common electrode 270 so that the orientations of the LC molecules in the LC layer 3 interposed between the two electrodes 191a/191b and 270 are determined.

Also, as described above, each of the sub-pixel electrodes 191a and 191b and the common electrode 270 form an LC capacitor Clca or Clcb to store the applied voltages even after the TFTs Qa and Qb are turned off. The first and second sub-pixel electrodes 191a and 191b and the first and second electrode members 177a and 177b connected thereto overlap a storage electrode 137 to form first and second storage capacitors Csta and Cstb, which are connected in parallel with the LC capacitors Clca and Clcb to enhance the voltage storing capacity thereof.

The outer boundary of each pixel electrode 191 is substantially a quadrangle.

A pair of a first and a second sub-pixel electrode 191a and 191b forming a pixel electrode 191 engage with each other with a gap 94 disposed therebetween, and the first sub-pixel electrode 191a is interposed in the center of the second sub-pixel electrode 191b.

A center cutout 91, upper cutouts 92a and 93a, and lower cutouts 92b and 93b are formed in the second sub-pixel electrode 191b, and the second sub-pixel electrode 191b is divided into a plurality of regions (partitions) by these cutouts 91-93b. The cutouts 91-93b substantially have inversion symmetry with respect to the storage electrode line 131.

The lower and upper cutouts 92a-93b obliquely extend substantially from a right edge of the pixel electrode 191 to the left and upper edge or lower edge of the pixel electrode 191. The lower and upper cutouts 92a-93b are disposed at lower and upper halves with respect to the storage electrode line 131, respectively. The lower and upper cutouts 92a-93b make an angle of about 45 degrees with the gate line 121, and they extend perpendicular to each other.

The center cutout 91 extends along the storage electrode line 131 and has an inlet toward the left edge of the pixel electrode 191. The center cutout 91 has a central transverse portion and a pair of oblique portions. The central transverse portion extends approximately from the right of the pixel electrode 191 to the left along the storage electrode line 131, and the pair of oblique portions extend from an end of the central transverse portion to the left edge of the pixel electrode 191 approximately parallel with the lower and upper cutouts 92a-93b, respectively.

Therefore, the lower half of the pixel electrode 191 is partitioned into 5 regions by the center cutout 91, the gap 94, and the lower cutouts 92b and 93b, and the upper half of the pixel electrode 191 also is partitioned into 5 regions by the center cutout 91, the gap 94, and the upper cutouts 92a and 93a. Here, the number of regions or the number of cutouts may vary according to the size of a pixel, the ratio of the transverse and longitudinal edges of the pixel electrode, the type or characteristics of the LC layer 3, or other design factors.

The first sub-pixel electrode 191a has a plurality of first, second, and third vertical sides 197a, 197b, and 197c parallel to the data lines 171a and 171b. The first blocking members 134a overlap the first sub-pixel electrode 191a neighboring the first vertical side 197a, the second blocking members 134b overlap the first sub-pixel electrode 191a neighboring the first vertical side 197b, and the third and fourth blocking members 135a and 135b overlap the first sub-pixel electrode 191a neighboring the third vertical side 197c.

The first, second, third, and fourth blocking members 134a, 134b, 135a, 135b connected to the storage electrode line 131 are supplied with the common voltage.

Because the first, second, and third vertical sides 197a, 197b, and 197c are disposed near the data lines 171a and 171b, the parasitic capacitance between the first and second data lines 171a and 171b, and the first sub-pixel electrode 191a, are easily generated on the circumferences of the first, second, and third vertical sides 197a, 197b, and 197c. Accordingly, the first, second, third, and fourth blocking members 134a, 134b, 135a, and 135b overlap the first sub-pixel electrode 191a on the circumferences of the first, second, and third vertical sides 197a, 197b, and 197c, respectively, such that the parasitic capacitance between the first and second data lines 171a and 171b, and the first sub-pixel electrode 191a, may be reduced.

The contact assistants 81, 82a and 82b are connected through the contact holes 181, 182a and 182b to the end portions 129 of the gate lines 121 and the end portions 179a and 179b of the data lines 171a and 171b, respectively. The contact assistants 81, 82a and 82b have a function of aiding the adhesion of the exposed end portions 129, 179a and 179b of the gate lines 121 and the data lines 171a and 171b to external apparatuses, and of protecting these portions.

Next, the upper panel 200 will be described with reference to FIG. 5, FIG. 6, and FIG. 7.

A light blocking member 220 having a plurality of openings 225 is formed on an insulating substrate 210 preferably made of transparent glass or plastic. The light blocking member 220 is also called a black matrix and prevents light leakage. The light blocking member 220 includes linear portions corresponding to the data lines 171 and planar portions corresponding to the TFTs, and it prevents light leakage between pixel electrodes 191 and defines openings that face the pixel electrodes 191. Alternatively, the light blocking member 220 may have a plurality of openings that face the pixel electrodes 191 and have substantially the same planar shape as the pixel electrodes 191.

A plurality of color filters 230 are also formed on the substrate 210. The color filters 230 are disposed substantially in the areas enclosed by the light blocking member 220, and they may extend in a longitudinal direction substantially along the pixel electrodes 191. Each of the color filters 230 may represent one of the primary colors such as red, green, and blue.

An overcoat 250 is formed on the color filters 230 and the light blocking member 220. The overcoat 250 is preferably made of an (organic) insulator, and it prevents the color filters 230 from being exposed and also provides a flat surface. The overcoat 250 may be omitted.

A common electrode 270 is formed on the overcoat 250. The common electrode 270 is preferably made of a transparent conductive material such as ITO and IZO.

The common electrode 270 has a plurality of sets of cutouts 71, 72, 73a, 73b, 74a, and 74b.

A set of cutouts 71-74b faces a pixel electrode 191 and includes first and second center cutouts 71 and 72, upper cutouts 73a and 74a, and lower cutouts 73b and 74b. Each of the cutouts 71-74b is disposed between adjacent cutouts 91-94b of the pixel electrode 191. Also, each of the cutouts 71-74b has at least an oblique branch extending parallel to the lower cutouts 93a and 94a or the upper cutouts 93b and 94b of the pixel electrode 191.

Each of the lower and upper cutouts 73a-74b includes an oblique branch, a transverse branch, and a longitudinal branch. The oblique branch extends approximately from a right edge of the pixel electrode 191 to the left and upper edge or lower edge of the pixel electrode 191, and it extends substantially parallel to the lower or upper cutouts 92a-93b of the pixel electrode 191. The transverse branch and the longitudinal branch extend from respective ends of the oblique branch along the edges of the pixel electrode 191, overlapping the edges of the pixel electrode 191 and making obtuse angles with the oblique branch.

Each of the first and second center cutouts 71 and 72 includes a pair of oblique branches, and a pair of terminal longitudinal branches. The central transverse branch extends approximately from the right of the pixel electrode 191 to the left along the transverse center line, and the pair of oblique branches extend from an end of the central transverse branch toward the left edge of the pixel electrode 191 substantially parallel to the lower and upper cutouts 73a, 73b, 74a, and 74b, respectively. The terminal longitudinal branches extend from the respective ends of the oblique branches along the left edge of the pixel electrode 191, overlapping the left edge of the pixel electrode 191 and making obtuse angles with the oblique branches.

Each of the oblique portions of the cutouts 71-74b has triangular notches. Each of the notches may have the shape of a quadrangle, a trapezoid, or a semicircle, and may be convex or concave. The notches determine the tilt directions of the LC molecules on the region boundaries corresponding to the cutouts 71-74b.

The number or direction of the cutouts 71-74b may also vary depending on design factors.

Alignment layers 11 and 21 are coated on inner surfaces of the panels 100 and 200, and they may be homeotropic.

Polarizers 12 and 22 are provided on outer surfaces of the panels 100 and 200, their polarization axes may be perpendicular to each other, and one of the polarization axes is preferably parallel to the gate lines 121.

The LCD may include a backlight unit (not shown) for supplying light to the polarizers 12 and 22, the panels 100 and 200, and the LC layer 3.

The LC layer 3 is in a state of negative dielectric anisotropy, and the LC molecules in the LC layer 3 are aligned such that their long axes are substantially vertical to the surfaces of the panels 100 and 200 in the absence of an electric field. Therefore, light incident into the liquid crystal layer 3 cannot pass through the crossed polarizers 12 and 22 and is blocked.

When a common voltage is applied to the common electrode 270 and a data voltage is applied to a pixel electrode 191, an electric field substantially perpendicular to the surfaces of the panels 100 and 200 is generated. The LC molecules tend to change their orientations in response to the electric field such that their long axes are perpendicular to the electric field direction. Hereinafter, both the pixel electrode 191 and the common electrode 270 are commonly referred to as "field-generating electrodes".

Meanwhile, the cutouts 91-93b of the pixel electrodes 191 and the cutouts 71-74b of the common electrode 270 of the field-generating electrodes 191 and 270 and the oblique edges of the pixel electrodes 191 that are parallel to those cutouts 91-93b and 71-74b distort the electric field to have a horizontal component that determines the tilt directions of the LC molecules. The horizontal component of the electric field is perpendicular to the oblique edges of the cutouts 91-93b and 71-74b and the oblique edges of the pixel electrodes 191.

Referring to FIG. 1, a set of common electrode cutouts 71-74b and a set of pixel electrode cutouts 91-93b divide a pixel electrode 191 into a plurality of sub-areas, and each sub-area has two major edges making oblique angles with the primary edges of the pixel electrode 191. Since the LC molecules on each sub-area tilt perpendicular to the major edges, the azimuthal distribution of the tilt directions are localized to four directions. In this way, the reference viewing angle of the LCD is increased by making the tilt directions of the LC molecules various.

At least one of the cutouts 91-93b and 71-74b can be substituted with protrusions or depressions, and the shapes and the arrangements of the cutouts 91-93b and 71-74b may be modified.

Now, the effects of LC panel assembly according to an exemplary embodiment of the present invention will be described in detail with reference to FIGS. 9 to 12.

Figure 11:
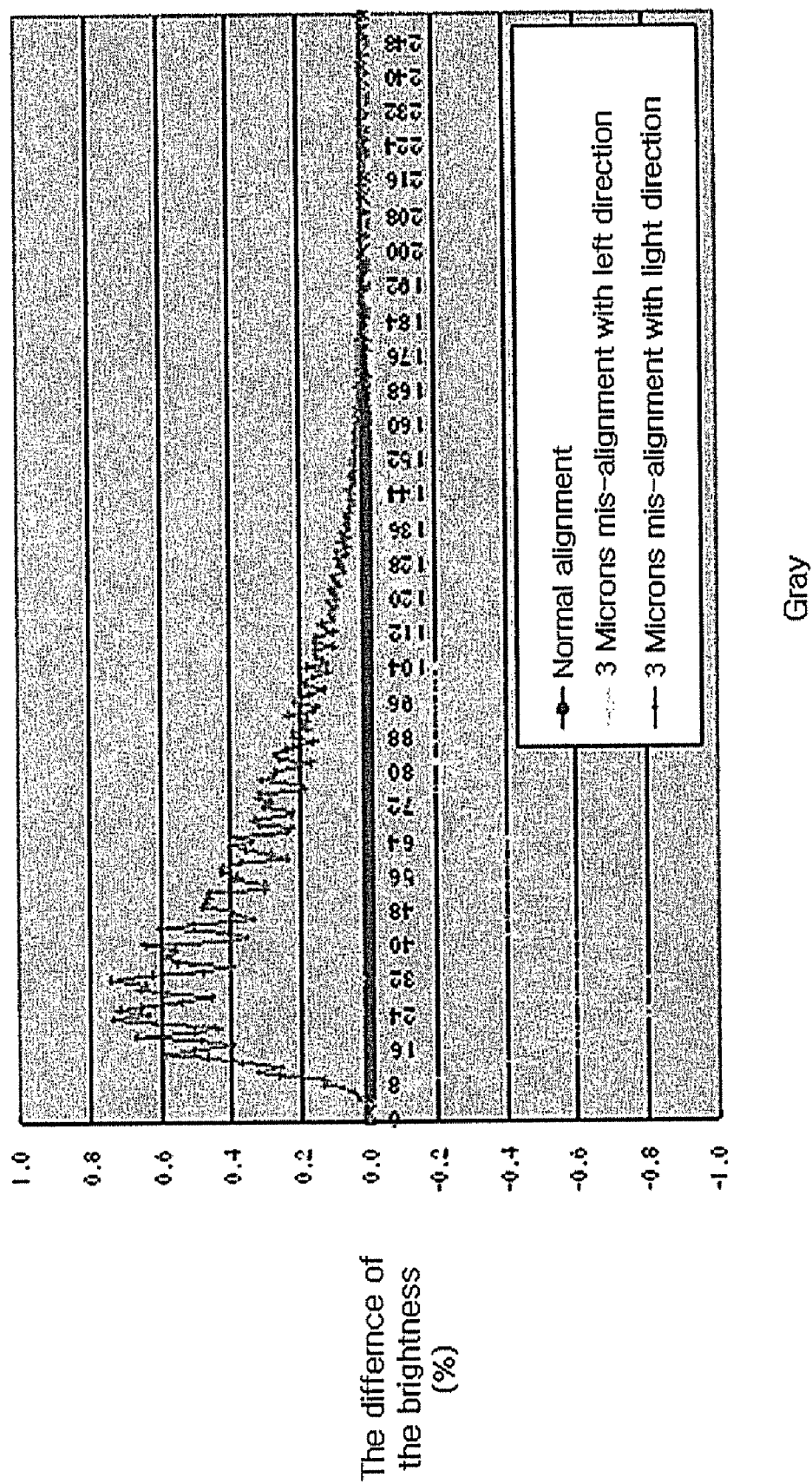
FIG. 11 is a graph showing the brightness according to grays in the cases of normal alignments and misalignments in a general LCD.
Figure 12:
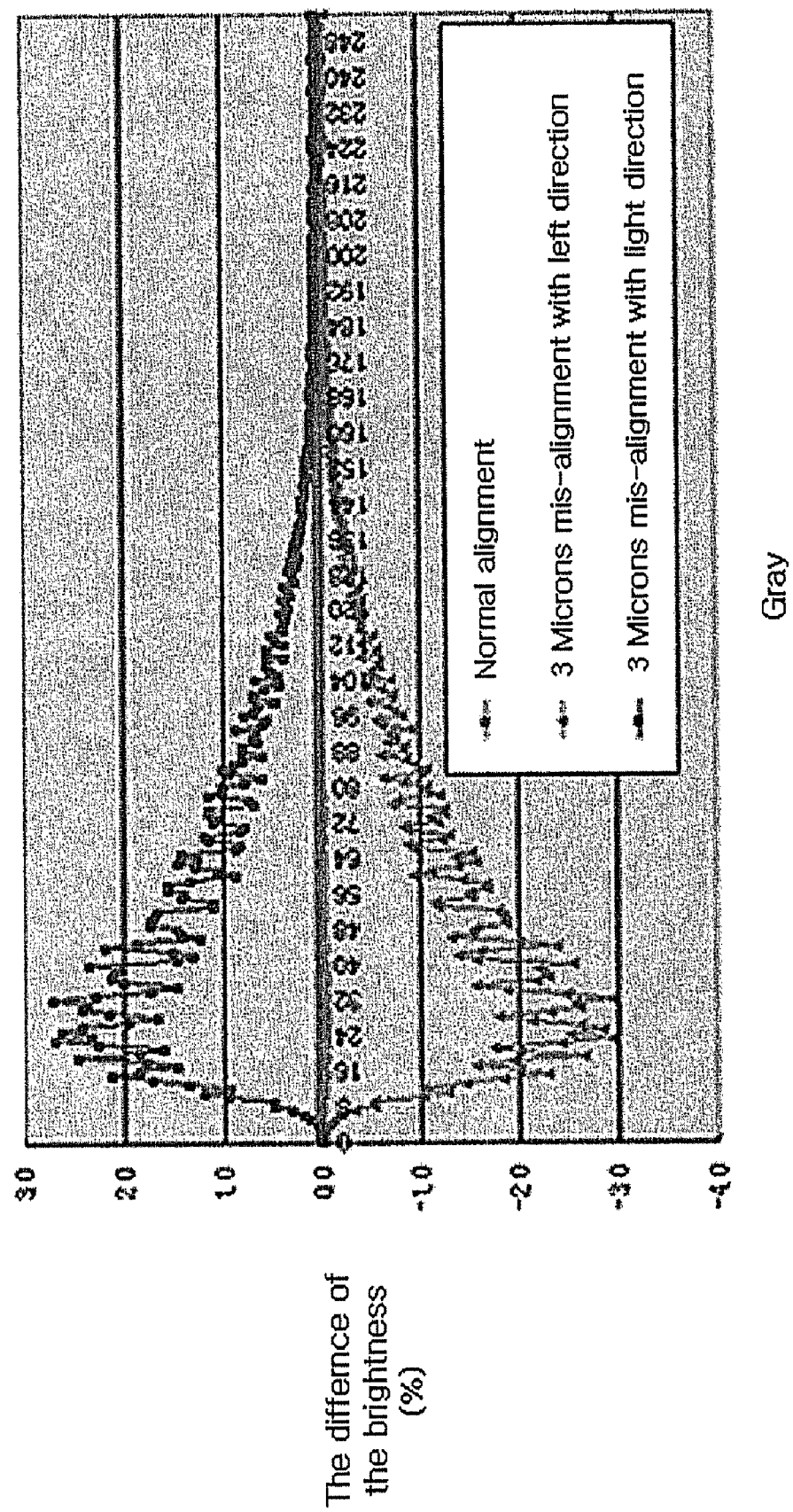
FIG. 12 is a graph showing the brightness according to grays in the cases of normal alignments and misalignments in an LCD according to an exemplary embodiment of the present invention.

FIG. 9 is a table showing various parasitic capacitances in the cases of normal alignments and misalignments in a general LCD, FIG. 10 is a table showing various parasitic capacitances in the cases of normal alignments and misalignments in an LCD according to an exemplary embodiment of the present invention, FIG. 11 is a graph showing the brightness according to grays in the cases of normal alignments and misalignments in a general LCD, and FIG. 12 is a graph showing the brightness according to grays in the cases of normal alignments and misalignments in an LCD according to an exemplary embodiment of the present invention.

Referring to FIG. 9, in an LCD not having blocking members to block the parasitic capacitance generated between the data lines 171a and 171b, and the first sub-pixel electrode 191a, the parasitic capacitances are measured in the cases that the data lines 171a and 171b, and the first sub-pixel electrode 191a are normally aligned, and the data lines 171a and 171b, and the first sub-pixel electrode 191a are respectively misaligned about 3 microns in the left and right directions.

In three cases, the values of the storage capacitor Cst and the liquid crystal capacitor Clc are about 407 ff and 413 ff, respectively.

In the normal alignment, the value of the parasitic capacitance generated between the left data line 171b and the first sub-pixel electrode 191a is 1.25 ff, and the value of the parasitic capacitance generated between the left data line 171b and the second sub-pixel electrode 191b is 1.34 ff. Also, the value of the parasitic capacitance generated between the right data line 171a, and the first sub-pixel electrode 191a is 1.34 fF, and the value of the parasitic capacitance generated between the right data line 171a, and the second sub-pixel electrode 191b is 1.24 fF.

In the misalignment of the left side, the value of the parasitic capacitance generated between the left data line 171b and the first sub-pixel electrode 191a is 1.52 fF, and the value of the parasitic capacitance generated between the left data line 171b and the second sub-pixel electrode 191b is 1.61 ff. Also, the value of the parasitic capacitance generated between the right data line 171a and the first sub-pixel electrode 191a is 1.23 fF, and the value of the parasitic capacitance generated between the right data line 171a and the second sub-pixel electrode 191b is 1.13 ff.

In the misalignment of the right side, the value of the parasitic capacitance generated between the left data line 171b and the first sub-pixel electrode 191a is 1.06 ff, and the value of the parasitic capacitance generated between the left data line 171b and the second sub-pixel electrode 191b is 1.15 fF. Also, the value of the parasitic capacitance generated between the right data line 171a and the first sub-pixel electrode 191a is 1.51 fF, and the value of the parasitic capacitance generated between the right data line 171a and the second sub-pixel electrode 191b is 1.41 ff.

That is to say, in the case of the misalignment of the left side, the parasitic capacitance generated between the left data line 171b and the pixel electrode 191 is increased in comparison with the normal alignment, and the parasitic capacitance generated between the right data line 171a and the pixel electrode 191 is reduced in comparison with the normal alignment. In the case of the misalignment of the right side, the parasitic capacitance generated between the right data line 171a and the pixel electrode 191 is increased in comparison with the normal alignment, and the parasitic capacitance generated between the left data line 171b and the pixel electrode 191 is reduced in comparison with the normal alignment.

Referring to FIG. 10, in an LCD having blocking members to block the parasitic capacitances generated between the data lines 171a and 171b, and the first sub-pixel electrode 191a, according to the embodiment of the present invention, the parasitic capacitances are measured in the cases that the data lines 171a and 171b and the first sub-pixel electrode 191a are normally aligned, and the data lines 171a and 171b and the first sub-pixel electrode 191a are respectively misaligned about 3 microns in the left and right directions.

In three cases, the values of the storage capacitor Cst and the liquid crystal capacitor Clc are about 407 fF and 413 fF, respectively, as in FIG. 9.

In the normal alignment, the value of the parasitic capacitance generated between the left data line 171b and the first sub-pixel electrode 191a is 0.529 fF, and the value of the parasitic capacitance generated between the left data line 171b and the second sub-pixel electrode 191b is 0.617 fF. Also, the value of the parasitic capacitance generated between the right data line 171a and the first sub-pixel electrode 191a is 0.618 fF, and the value of the parasitic capacitance generated between the right data line 171a and the second sub-pixel electrode 191b is 0.527 fF.

In the misalignment of the left side, the value of the parasitic capacitance generated between the left data line 171b and the first sub-pixel electrode 191a is 0.63 fF, and the value of the parasitic capacitance generated between the left data line 171b and the second sub-pixel electrode 191b is 0.72 fF. Also, the value of the parasitic capacitance generated between the right data line 171a and the first sub-pixel electrode 191a is 0.61 fF, and the value of the parasitic capacitance generated between the right data line 171a and the second sub-pixel electrode 191b is 0.52 fF.

In the misalignment of the right side, the value of the parasitic capacitance generated between the left data line 171b and the first sub-pixel electrode 191a is 0.49 fF, and the value of the parasitic capacitance generated between the left data line 171b and the second sub-pixel electrode 191b is 0.59 fF. Also, the value of the parasitic capacitance generated between the right data line 171a and the first sub-pixel electrode 191a is 0.67 fF, and the value of the parasitic capacitance generated between the right data line 171a and the second sub-pixel electrode 191b is 0.6 fF.

That is to say, the parasitic capacitance generated between the left or the right data lines 171a or 171b and the pixel electrode 191 is reduced or increased depending on the misalignments, as in FIG. 9.

In the comparisons of FIGS. 9 and 10, the absolute values of the parasitic capacitances of the case of FIG. 10 are remarkably reduced. That is to say, the blocking members 134a, 134b, 135a, and 135b decrease the parasitic capacitance generated between the left and right data lines 171a and 171b, and the pixel electrode 191.

Next, referring to FIG. 11, the differences of the brightness according to the grays for the general LCD are measured in the cases in which the data lines 171a and 171b, and the first sub-pixel electrode 191a, are normally aligned, and when the data lines 171a and 171b, and the first sub-pixel electrode 191a, are respectively misaligned about 3 microns in the left and right directions. The differences of the brightness according to the grays in the cases of normal alignment are very small at about 0%, and differences of the brightness between the pixels in the cases of misalignment are generated, specifically the differences of the brightness are large in the lower grays. That is to say, if the misalignment is generated in the left direction, the differences of the brightness between the pixels are generated at a maximum of about −3%, and if the misalignment is generated in the right direction, the differences of the brightness between the pixels are generated at a maximum of about +3%

Next, referring to 12, the differences of the brightness according to the grays for the LCD according to the present very small at about 0% in the case of the normal alignment, as in FIG. 11. However, if the misalignment is generated in the left direction, the differences of the brightness between the pixels are generated at a maximum of about −0.83%, and if the misalignment is generated in the right direction, the differences of the brightness between the pixels are generated at a maximum of about +0.83%, differently from the case of FIG. 11. In comparison with FIG. 11, the differences of the brightness between the pixels are remarkably reduced.

That is to say, in the LCD according to the embodiment of the present invention, the absolute values of the parasitic capacitance generated between the data lines 171a and 171b, and the pixel electrode 191, specifically the first sub-pixel electrode 191a, is reduced, such that the differences of the brightness between the pixels may be minimized even if the misalignments are generated.

Now, a structure of the LC panel assembly according to another embodiment of the present invention will be described in detail with reference to FIG. 13 to FIG. 18.

Figure 13:
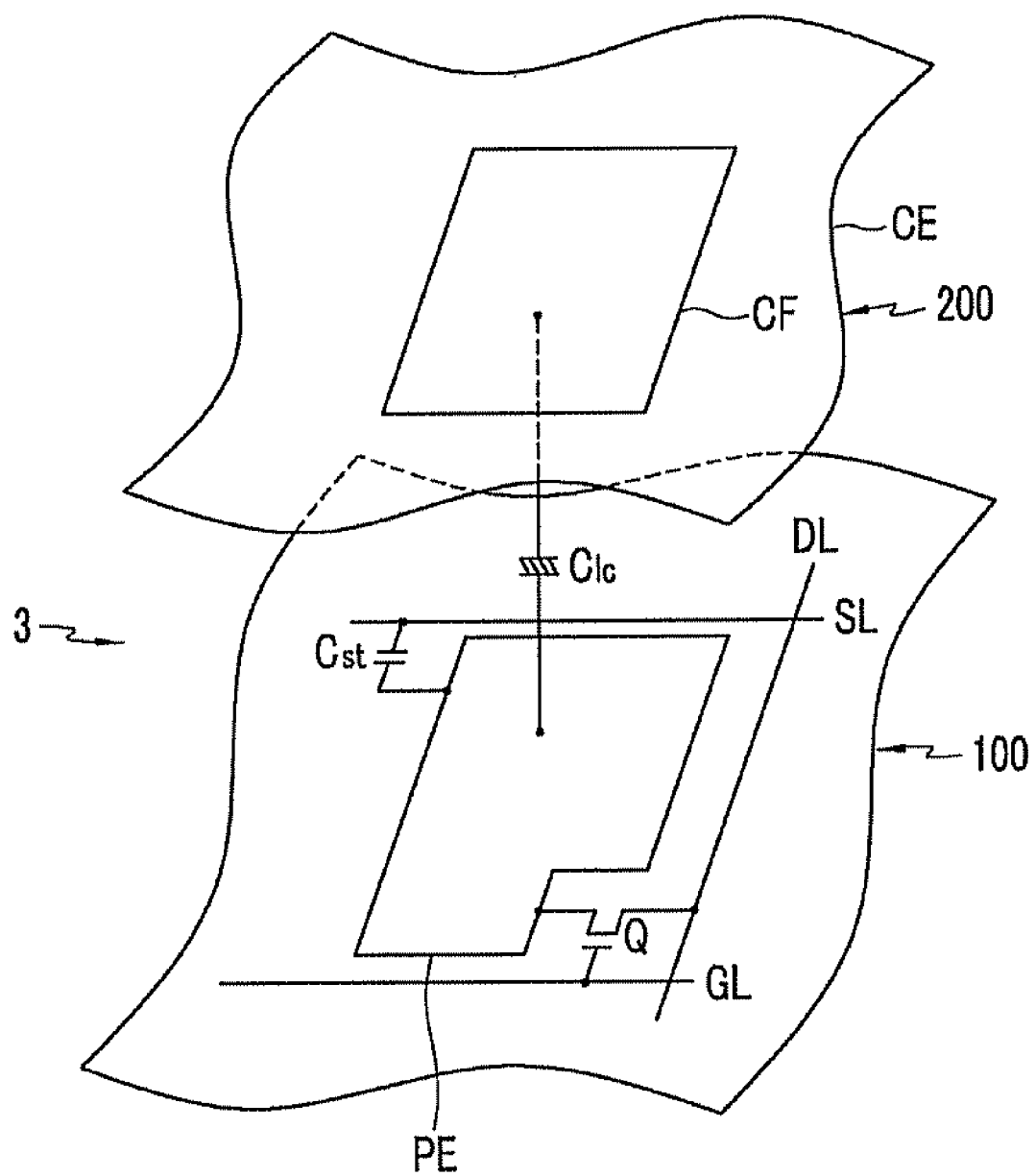
FIG. 13 is an equivalent circuit diagram of a pixel of an LCD according to another exemplary embodiment of the present invention.

FIG. 13 is an equivalent circuit diagram of a pixel of an LC panel assembly according to another exemplary embodiment of the present invention.

Referring to FIG. 13, an LCD according to this exemplary embodiment of the present invention includes a lower panel 100 and an upper panel 200 opposing the lower panel 100, and an LC layer 3 interposed between the two panels 100 and 200.

The lower panel 100 according to the present embodiment includes signal lines including a plurality of gate lines GL, a plurality of data lines DL, and a plurality of storage electrode lines SL, and each pixel includes a switching element Q that is respectively connected to the corresponding gate line GL and a data line DL, an LC capacitor Clc that is connected to the switching element Q, and a storage capacitor Cst that is connected to the switching element Q and the storage electrode line SL.

Each switching element Q including a thin film transistor (TFT) is a three-terminal element provided on the lower panel 100, and it has a control terminal connected to a gate line GL, an input terminal connected to a data line DL, and an output terminal connected to an LC capacitor Clc and a storage capacitor Cst.

The LC capacitor Clc includes a pixel electrode PE provided on the lower panel 100 and a common electrode CE provided on an upper panel 200 as two terminals, and the LC layer 3 disposed between the pixel electrode PE and the common electrode CE functions as a dielectric of the LC capacitor Clc. The common electrode CE is formed on the entire surface of the upper panel 200 and supplied with a common voltage Vcom. The LC layer 3 has negative dielectric anisotropy, and the LC molecules in the LC layer 3 may be aligned such that their major axes are substantially perpendicular to the two panels 100 and 200 in the absence of an electric field.

Herein, detailed descriptions of the storage capacitor Cst and the actions of the LCD including this LC panel assembly, which were previously described, will be omitted. However, in the LCD of FIG. 13, one pixel PX is not separated into sub-pixels.

Now, an LC panel assembly shown in FIG. 13 will be described in detail with reference to FIG. 14 to FIG. 18.

Figure 14:
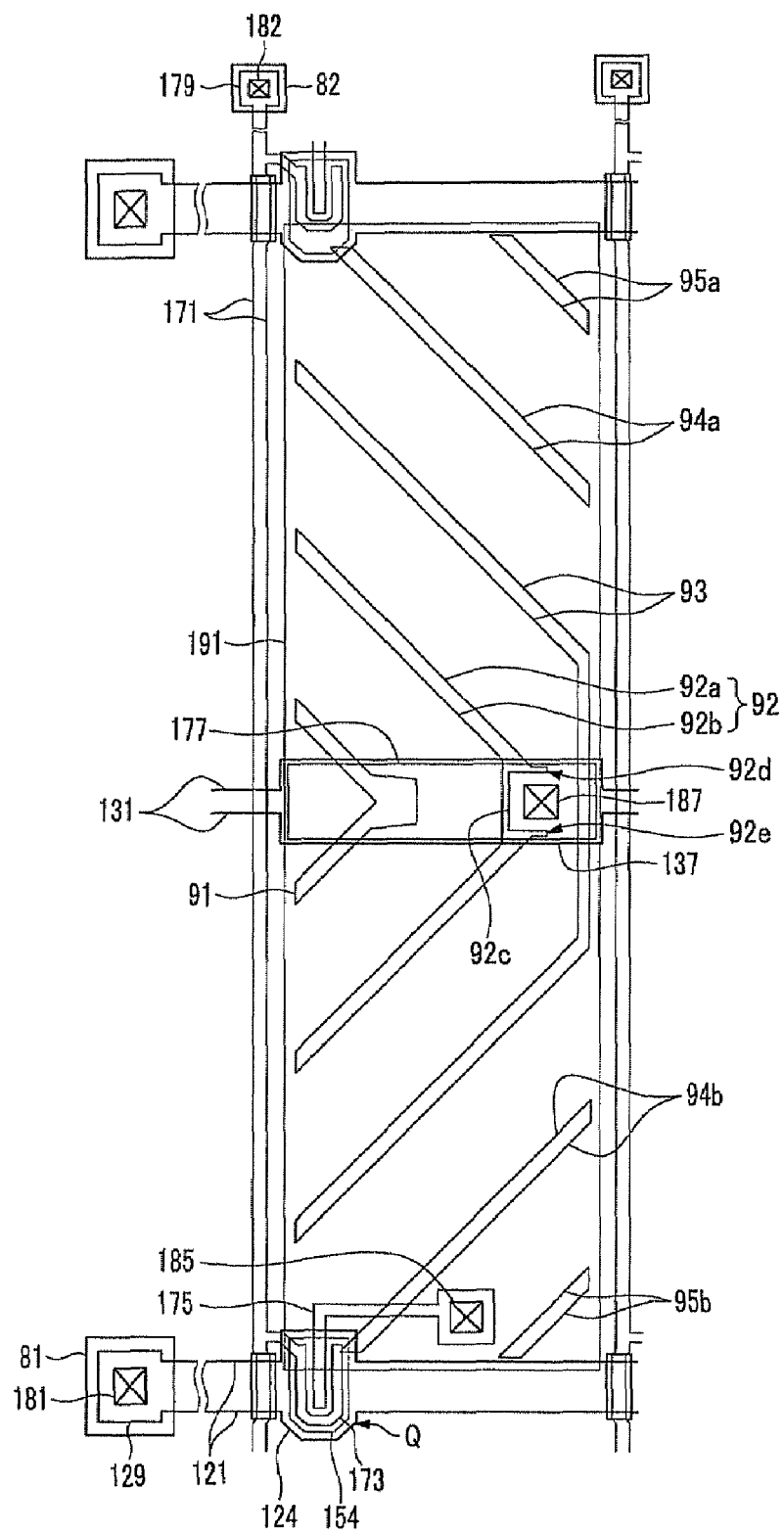
FIG. 14 is a layout view of a lower panel for a pixel of an LCD according to an exemplary embodiment of the present invention.
Figure 15:
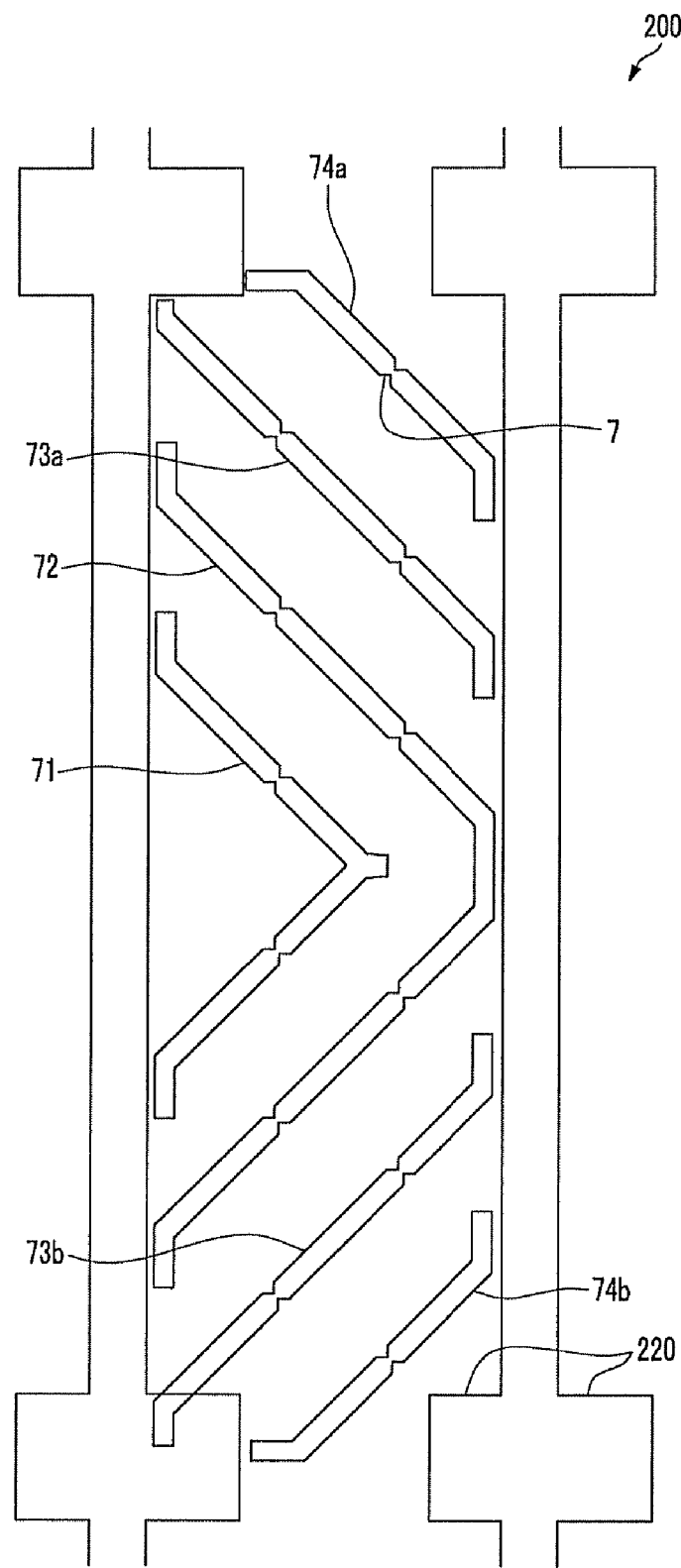
FIG. 15 is a layout view of an upper panel for a pixel of an LCD according to another exemplary embodiment of the present invention.
Figure 16:
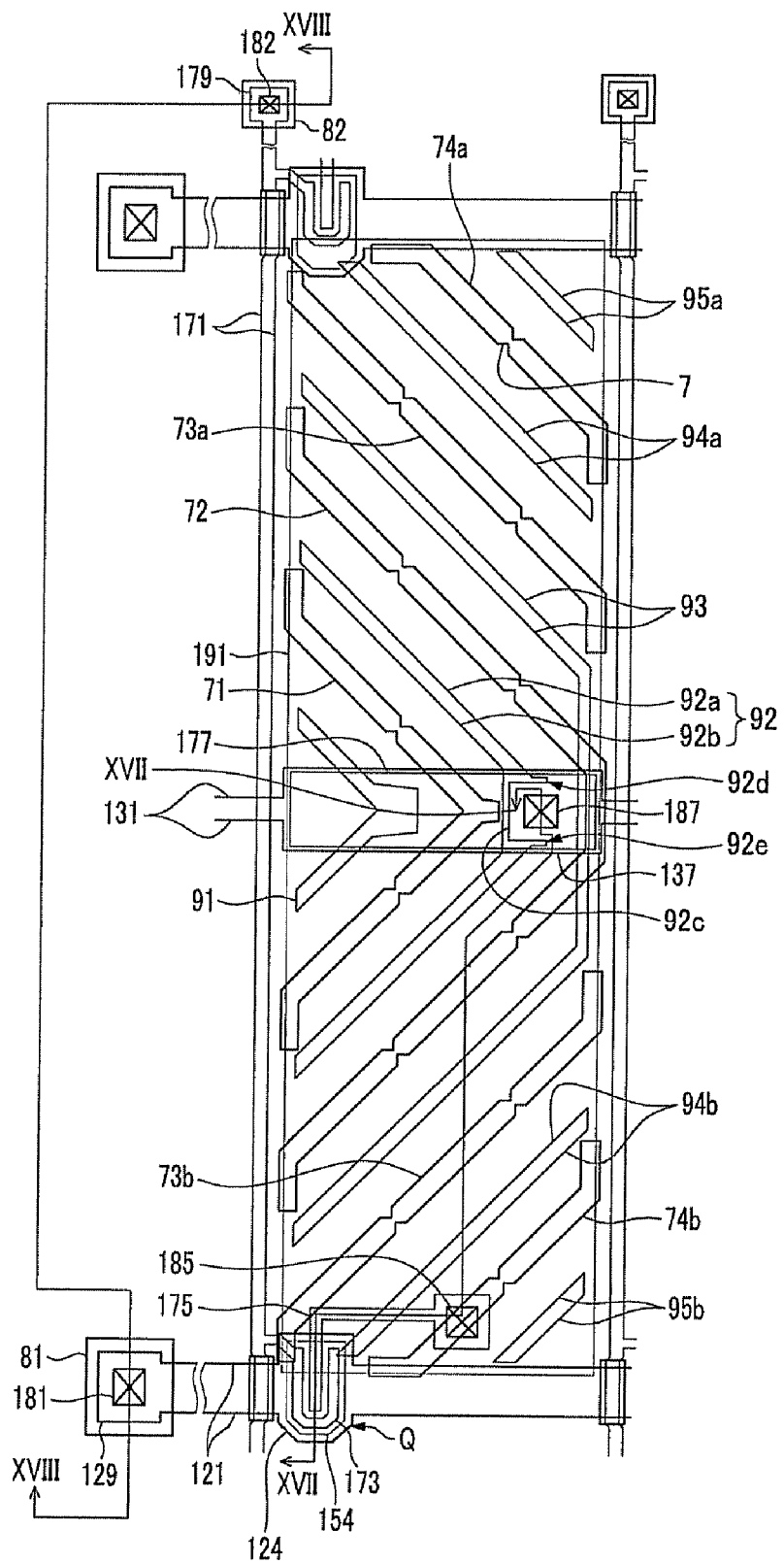
FIG. 16 is a layout view of an LCD including the lower panel shown in FIG. 14 and the upper panel shown in FIG. 15.
Figure 17:
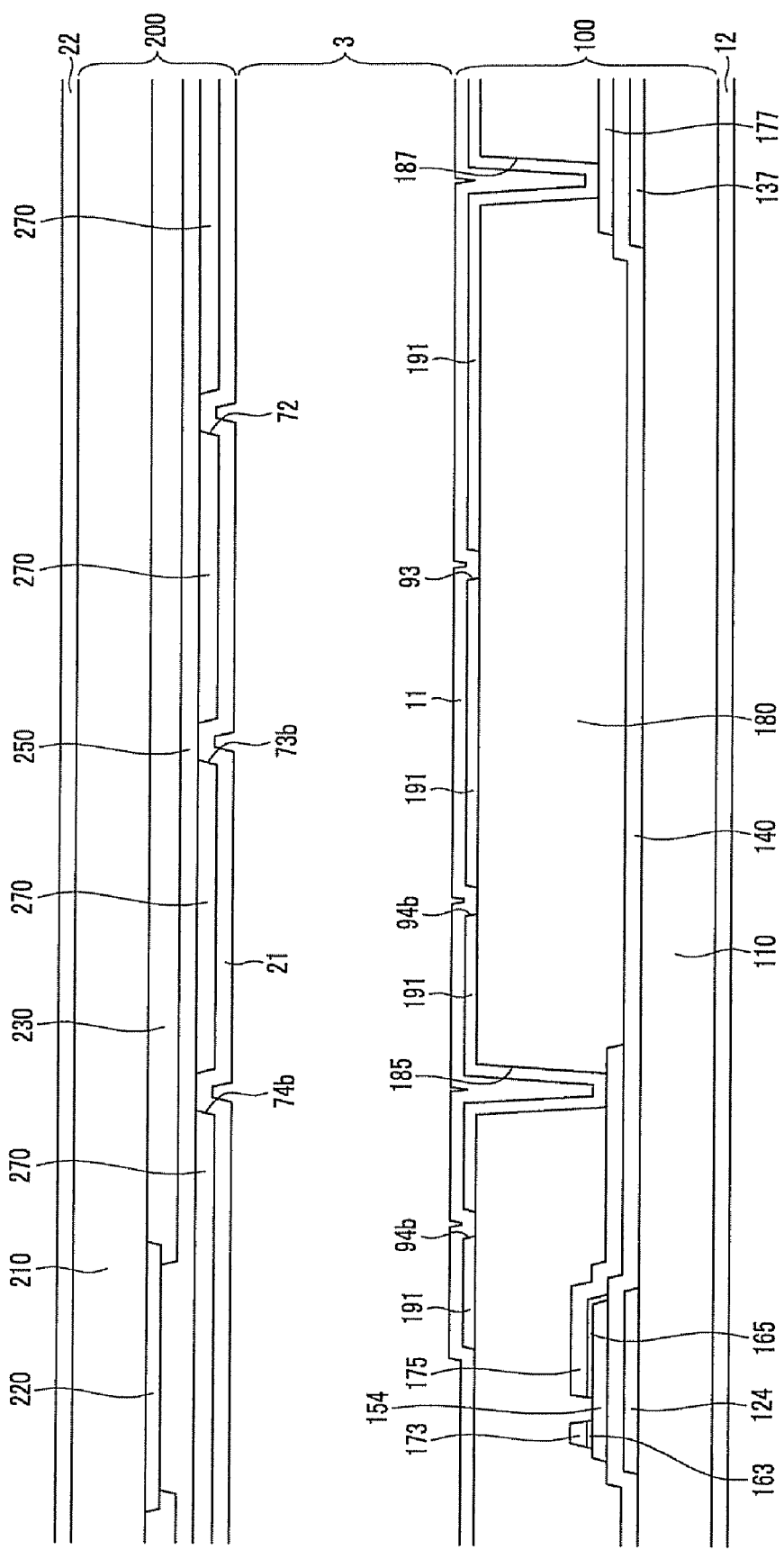
FIG. 17 and FIG. 18 are cross-sectional views of the LCD illustrated in FIG. 16 taken along the line XVII-XVII and the line XVIII-XVIII.
Figure 18:
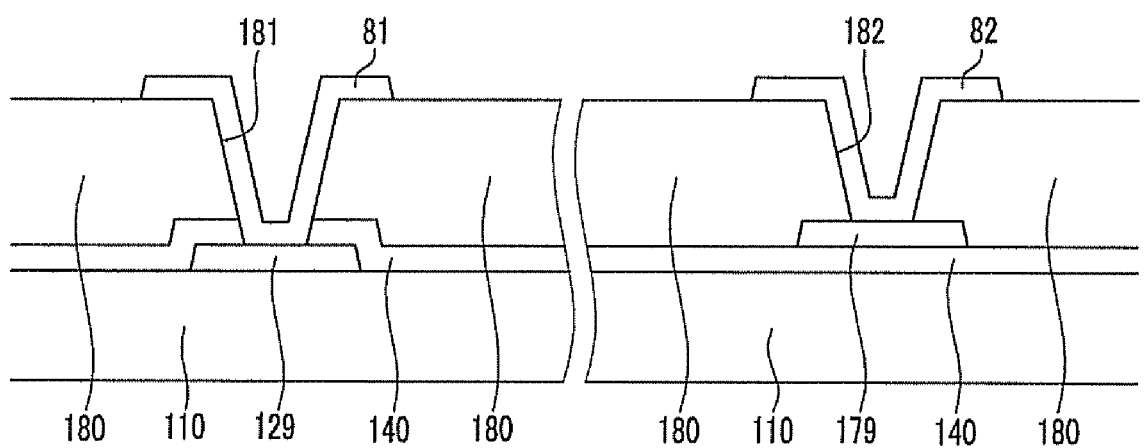
Figure 19A:
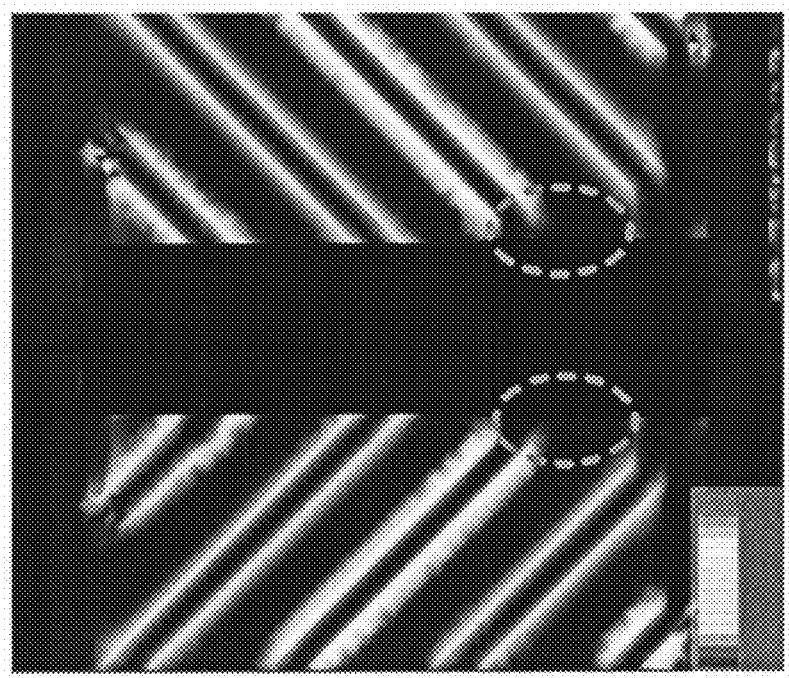
FIGS. 19a to 19d are photos showing motion of LC molecules according to time in a general LCD.
Figure 19B:
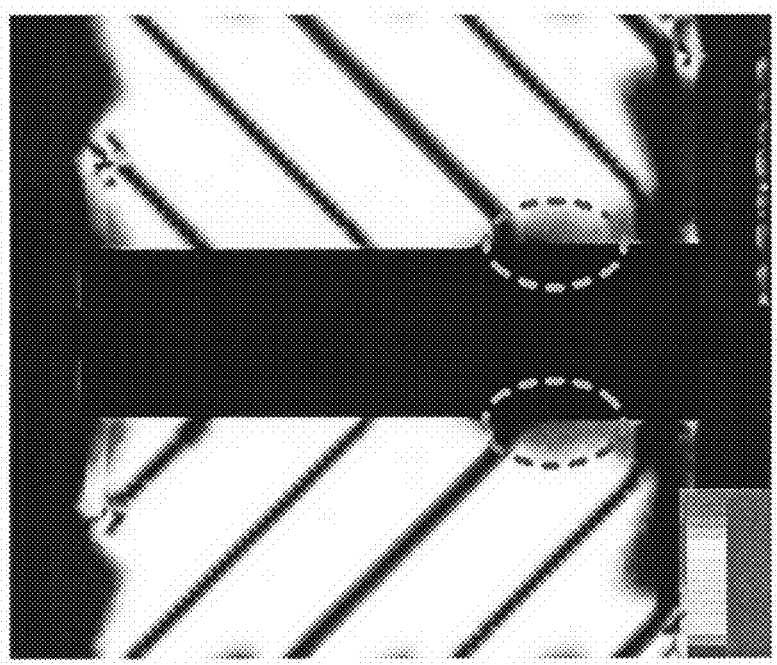
Figure 19C:
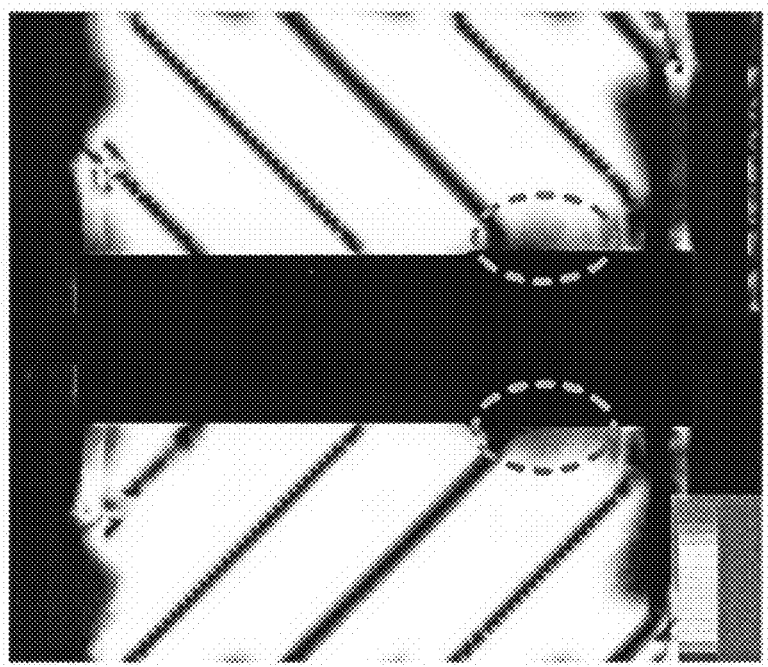
Figure 19D:
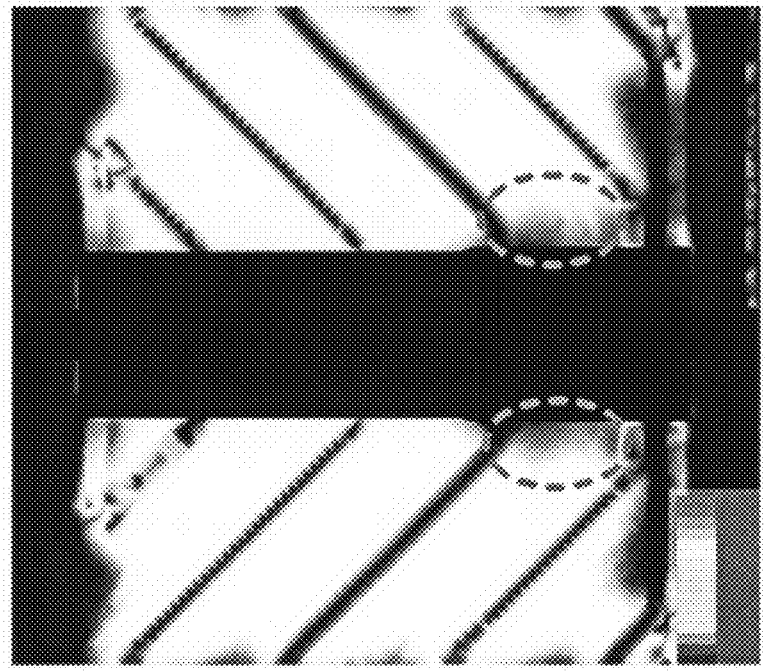
Figure 20A:
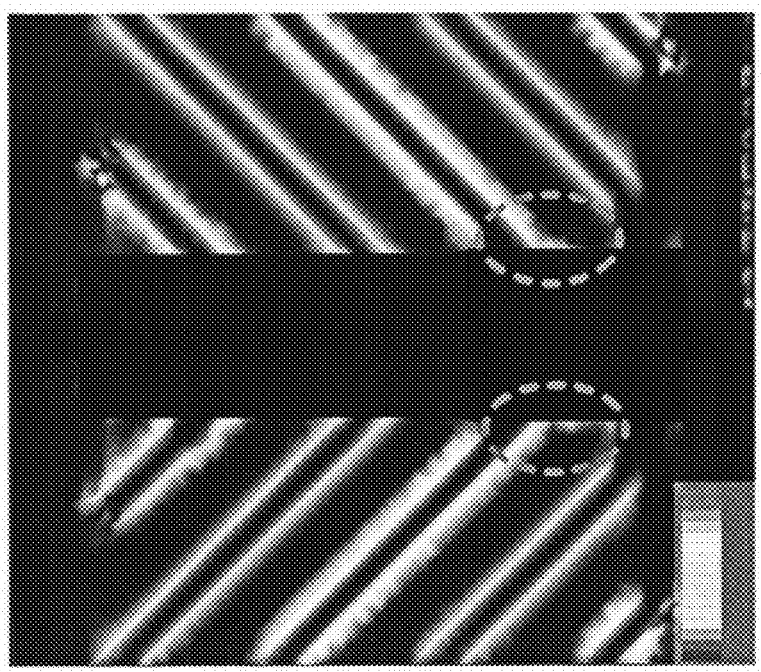
FIGS. 20a to 20d are photos showing motion of LC molecules according to time in an LCD according to an exemplary embodiment of the present invention.
Figure 20B:
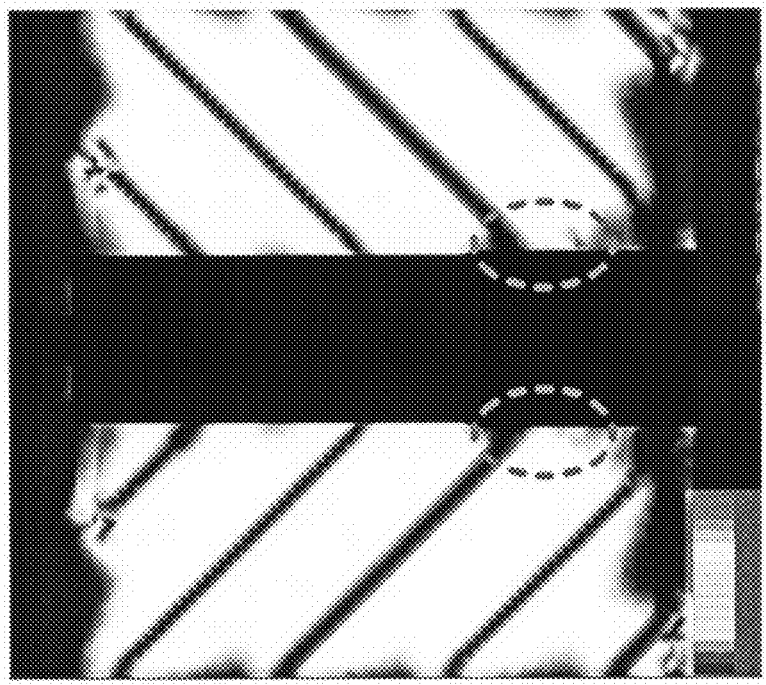
Figure 20C:
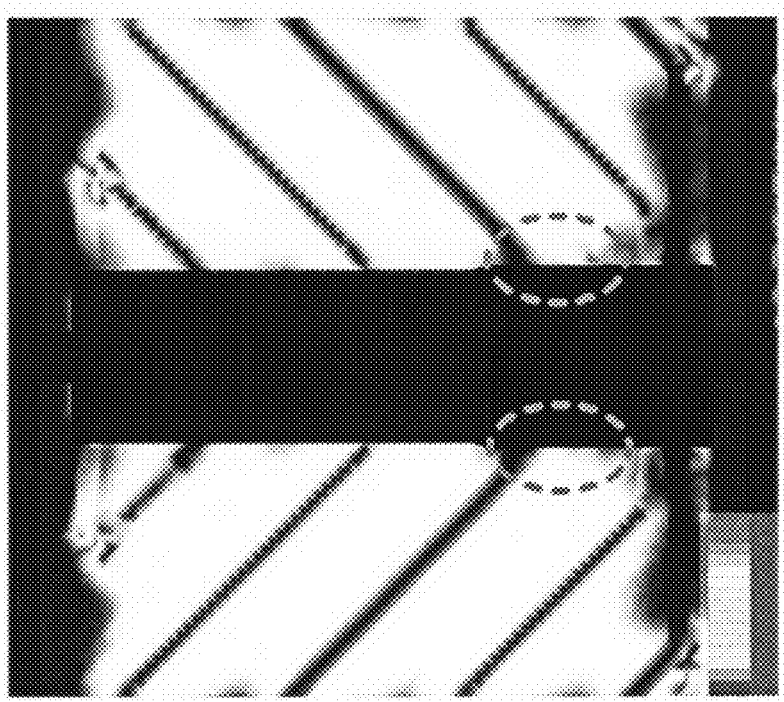
Figure 20D:
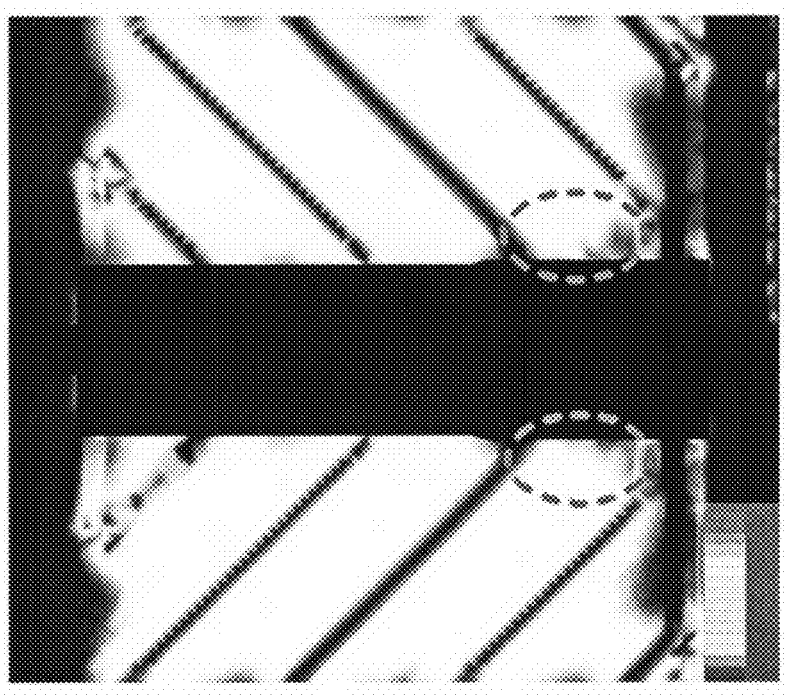

FIG. 14 is a layout view of a lower panel for a pixel of an LCD according to an exemplary embodiment of the present invention, FIG. 15 is a layout view of an upper panel for a pixel of an LCD according to another exemplary embodiment of the present invention, FIG. 16 is a layout view of an LCD including the lower panel shown in FIG. 14 and the upper panel shown in FIG. 15, and FIG. 17 and FIG. 18 are cross-sectional views of the LCD illustrated in FIG. 16 taken along the line XVII-XVII and the line XVIII-XVIII, respectively.

An LCD according to an exemplary embodiment of the present invention includes a lower panel 100 and an upper panel 200 opposing the lower panel 100, and an LC layer 3 interposed between the two panels 100 and 200.

Referring to the lower panel, a plurality of gate conductors including a plurality of gate lines 121 and a plurality of storage electrode lines 131 are formed on a substrate 110. Each gate line 121 includes a gate electrode 124 and an end portion 129, and each storage electrode line 131 includes a storage electrode 137. A gate insulating layer 140, a plurality of semiconductors 154, and a plurality of ohmic contacts 163 and 165 are sequentially formed thereon. A plurality of data conductors including a plurality of data lines 171 including source electrodes 173 and end portions 179, a plurality of drain electrodes 175, and a plurality of electrode members 177 are formed on the ohmic contacts 163 and 165 and the gate insulating layer 140. A passivation layer 180 is formed on the data conductors 171 and 175, and on the exposed semiconductors 154. A plurality of contact holes 181, 182, 185, and 187 are provided at the passivation layer 180 and the gate insulating layer 140. A plurality of pixel electrodes 191 and a plurality of contact assistants 81 and 82 are formed on the passivation layer 180, and an alignment layer 11 is coated thereon.

Regarding the upper panel 200, a light blocking member 220, a plurality of color filters 230, an overcoat 250, a common electrode 270, and an alignment layer 21 are formed on an insulating substrate 210.

Different from the LCD according to the previous embodiment, the pixel electrodes 191 are not separated and are formed with one body, and the thin film transistors Q connected to the pixel electrodes 191 are connected to a gate line 121 and a data line 171.

The electrode members 177 are separated from the drain electrodes 175 and overlap the storage electrodes 137. Also, the electrode members 177 across the central portion of the pixel electrodes 191 are connected to the pixel electrodes 191 through the contact holes 187 such that the electrode members 177 enforce the storage capacitance between the pixel electrodes 191 and the storage electrodes 137.

The outer boundary of each pixel electrode 191 having four sides parallel to the gate line 121 and the data line 171 is substantially a quadrangle.

A first center cutout 91, a second center cutout 92, a third center cutout 93, first and second upper cutouts 94a and 95a, and first and second lower cutouts 94b and 94b are formed in the pixel electrode 191, and the pixel electrode 191 is divided into a plurality of regions (partitions) by these cutouts 91-95b. The cutouts 91-95b substantially have inversion symmetry with respect to the storage electrode line 131.

The first and second lower and upper cutouts 94a-95b obliquely extend substantially from a right edge of the pixel electrode 191 to the left and upper edge or lower edge of the pixel electrode 191, they are disposed at lower and upper halves with respect to the storage electrode line 131, respectively, and they make an angle of about 45 degrees with the gate line 121 and they extend perpendicular to each other.

The first center cutout 91 has a transverse portion extending along the storage electrode line 131, and a pair of oblique sides parallel to the first and second lower and upper cutouts 94a-95b.

The second center cutout had a pair of oblique sides 92a and 92b parallel to the first and second lower and upper cutouts 94a-95b, respectively, a central side 92c perpendicular to the storage electrode line 131, and a pair of concave portions 92*d* and 92*e* disposed between the central side 92*c* and the respective oblique sides 92*a* and 92*b*. At least one of the oblique sides 92*a* and 92*b* meets the storage electrode line 131, and the central side 92*c* overlaps the storage electrode line 131. Accordingly, the central side 92*c* of the second center cutout 92 does not exist above or below the storage electrode line 131. The concave portions 92*d* and 92*e* form enough area to overlap the contact hole 187 for connecting the electrode member 177 and the pixel electrode 191 with the storage electrode line 131.

The third center cutout 93 has a vertical portion perpendicular to the storage electrode line 131 and a pair of oblique sides parallel to the first and second lower and upper cutouts 94*a*-95*b*.

Therefore, the lower half of the pixel electrode 191 is partitioned into 6 regions by the first to third center cutouts 91-93 and the first and second lower cutouts 94*b* and 95*b*, and the upper half of the pixel electrode 191 is also partitioned into 6 partitions by the first to third center cutouts 91-93 and the upper cutouts 94*a* and 95*a*. Here, the number of regions or the number of cutouts may vary according to the size of a pixel, the ratio of the transverse and longitudinal edges of the pixel electrode, the type or characteristics of the LC layer 3, or other design factors.

The common electrode 270 has a plurality of sets of cutouts 71, 72, 73*a*, 73*b*, 74*a*, and 74*b*.

A set of cutouts 71-74*b* faces a pixel electrode 191 and includes first and second center cutouts 71 and 72, first and second upper cutouts 73*a* and 74*a*, and first and second lower cutouts 73*b* and 74*b*. Each of the cutouts 71-74*b* is disposed between adjacent cutouts 91-95*b* of the pixel electrode 191. Also, each of the cutouts 71-74*b* has at least an oblique portion extending parallel to the first and second upper cutouts 94*a* and 95*a* or the first and second lower cutouts 94*b* and 95*b* of the pixel electrode 191. Each of the oblique portions of the cutouts 71-74*b* has triangular notches 7. The cutouts 71-74*b* substantially have inversion symmetry with respect to the storage electrode line 131.

Each of the first lower and upper cutouts 73*a* and 73*b* includes an oblique branch and a longitudinal branch. The oblique branch extends approximately from a right edge of the pixel electrode 191 to the left and upper edge or lower edge of the pixel electrode 191, and the longitudinal branch extends from respective ends of the oblique branch along the edges of the pixel electrode 191, overlapping the edges of the pixel electrode 191 and making obtuse angles with the oblique branch.

Each of the second lower and upper cutouts 74*a* and 74*b* includes an oblique branch, a transverse branch, and a longitudinal branch. The oblique branch extends approximately from a right edge of the pixel electrode 191 to the left and upper edge or lower edge of the pixel electrode 191, and it extends substantially parallel to the lower or upper cutouts 92*a*-93*b* of the pixel electrode 191. The transverse branch and the longitudinal branch extend from respective ends of the oblique branch along the edges of the pixel electrode 191, overlapping the edges of the pixel electrode 191 and making obtuse angles with the oblique branch.

Each of the first center cutouts 71 includes a central transverse branch, a pair of oblique branches, and a pair of terminal longitudinal branches. The central transverse branch extends along the storage electrode line 131, and the pair of oblique branches extend from an end of the central transverse branch toward the left edge of the pixel electrode 191 substantially parallel to the first and second lower and upper cutouts 73*a*, 73*b*, 74*a*, and 74*b*, respectively. The terminal longitudinal branches extend from the respective ends of the oblique branches along the left edge of the pixel electrode 191, overlapping the left edge of the pixel electrode 191 and making obtuse angles with the oblique branches.

Each of the second center cutouts 72 includes a central longitudinal branch, a pair of oblique branches, and a pair of terminal longitudinal branches. The central longitudinal branch extends perpendicular to the storage electrode line 131, and the pair of oblique branches extend from an end of the central longitudinal branch toward the left edge of the pixel electrode 191 substantially parallel to the first and second lower and upper cutouts 73*a*, 73*b*, 74*a*, and 74*b*, respectively. The terminal longitudinal branches extend from the respective ends of the oblique branches along the left edge of the pixel electrode 191, overlapping the left edge of the pixel electrode 191 and making obtuse angles with the oblique branches.

The number or direction of the cutouts 71-74*b* may also vary depending on design factors, and the light blocking member 220 may also overlap the cutouts 71 to 74*b* to block light leakage through the cutouts 71 to 74*b*.

In the above description, the pixel electrode 191 is not divided and at least one of oblique sides 92*a* and 92*b* meets the storage electrode line 131, but the present invention is not limited thereto. The pixel electrode 191 may be divided into two sub-pixel electrodes as shown in FIGS. 4-8, and the oblique side of the gap disposed between two sub-pixel electrodes may meet the storage electrode 137.

Now, the effects of the LCD according to an exemplary embodiment of the present invention will be described in detail with reference to FIGS. 19*a* to 20*d* as well as FIGS. 14-18.

The cutouts 91 to 95*b* and 71 to 74*b* of the electrodes 191 and 270 and the edges of the pixel electrodes 191 distort the electric field to have a horizontal component that is substantially perpendicular to the edges of the cutouts 91 to 95*b* and 71 to 74*b* and the edges of the pixel electrodes 191. Accordingly, the LC molecules on each sub-area are tilted in a direction perpendicular to the main edges of the cutouts 91 to 95*b* and 71 to 74*b*. However, if the LC molecules are dispersed, the texture is generated such that the normal brightness of the pixels does not display.

In the embodiments according to the present invention, the oblique sides 92*a* of the second central cutouts 92 meet the storage electrode line 131 such that the uniform electrical field is formed at the circumference of the storage electrode 137. Accordingly, the LC molecules disposed on the circumference of the storage electrode 137 are not dispersed. The direction of the LC molecules tilted perpendicular to the edges of the cutouts 91 to 95*b* and 71 to 74*b* is maintained on the circumference of the storage electrode 137 such that the texture due to the dispersion of the LC molecules may be prevented.

FIGS. 19*a* to 19*d* are photos showing motion of the LC molecules according to time in a general LCD, and FIGS. 20*a* to 20*d* are photos showing motion of the LC molecules according to time in an LCD according to an exemplary embodiment of the present invention.

FIGS. 19*a* to 19*d* and FIGS. 20*a* to 20*d* show the motion of the LC molecules with regard to 5 ms, 10 ms, 15 ms, and 20 ms when changing a black state to a white state.

As shown in FIGS. 19*a* to 19*d*, in the general LCD, when contrasting the portions indicated by circle dotted lines in each drawing, the black texture due to the dispersion of the LC molecules remains on the circumference of the storage electrode 137 after enough passage of time.

On the contrary, in the LCD according to an exemplary embodiment of the present invention, the black texture due to the dispersion of the LC molecules is reduced as shown in FIGS. 20a-20d. Accordingly, the texture may be prevented and the transmittance of the pixel may be improved.

According to the present invention, the parasitic capacitance generated between the data lines and the pixel electrode is reduced such that the differences of the brightness between the pixels may be minimized, even if misalignments are generated.

Further, the tilt direction of the LC molecules is maintained at the circumference of the storage electrode such that the texture may be prevented thereby improving the transmittance of the pixel.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A liquid crystal display comprising:
   a pixel electrode having a first sub-pixel electrode and a second sub-pixel electrode;
   a first thin film transistor connected to the first sub-pixel electrode;
   a second thin film transistor connected to the second sub-pixel electrode;
   a first data line connected to the first thin film transistor;
   a second data line connected to the second thin film transistor;
   a gate line connected to the first and second thin film transistors, and intersecting the first and second data lines; and
   a blocking member overlapping at least one portion of the first sub-pixel electrode.

2. The liquid crystal display of claim 1, wherein the blocking member is made of the same material as the gate line.

3. The liquid crystal display of claim 2, further comprising a storage electrode line overlapping the pixel electrode, wherein the blocking member is extended from the storage electrode line.

4. The liquid crystal display of claim 3, wherein the blocking member includes a first blocking member and a second blocking member extended in the same direction.

5. The liquid crystal display of claim 1, wherein the voltage of the first sub-pixel electrode is larger than the voltage of the second sub-pixel electrode.

6. The liquid crystal display of claim 1, wherein the area of the first sub-pixel electrode is smaller than the area of the second sub-pixel electrode.

7. The liquid crystal display of claim 1, wherein the first and second thin film transistors are turned on according to a signal of the gate line, which transmits the signals of the first and second data lines.

8. The liquid crystal display of claim 1, wherein the blocking member overlaps an edge of the first sub-pixel electrode adjacent to the first and second data lines.

9. The liquid crystal display of claim 8, wherein the blocking member is substantially parallel to the first and second data lines.

10. The liquid crystal display of claim 1, wherein the pixel electrode has a first cutout including an oblique portion obliquely extended with respect to the gate line.

11. The liquid crystal display of claim 1, further comprising a common electrode facing the pixel electrode, wherein the common electrode has a second cutout including an oblique portion obliquely extended with respect to the gate line.

12. The liquid crystal display of claim 1, wherein the blocking member overlaps the second sub-pixel electrode.

13. A liquid crystal display comprising:
    a gate line and a storage electrode line;
    a data line intersecting the gate line;
    a thin film transistor connected to the gate line and the data line; and
    a pixel electrode connected to the thin film transistor;
    wherein the pixel electrode has at least one oblique side which meets the storage electrode line and forms oblique angles to the gate line and the data line, and a central side overlapping the storage electrode line and neighboring the oblique side.

14. The liquid crystal display of claim 13, wherein the central side is substantially parallel to the data line.

15. The liquid crystal display of claim 13, wherein the central side overlaps the storage electrode line.

16. The liquid crystal display of claim 14, wherein the oblique side includes first and second oblique sides which are symmetrical with respect to the storage electrode line.

17. The liquid crystal display of claim 14, wherein a concave portion is formed between the oblique side and the central side.

18. The liquid crystal display of claim 13, wherein the angle between the oblique side and the gate line or the data line is about 45 degrees or about 135 degrees.

19. The liquid crystal display of claim 14, further comprising an electrode member overlapping the storage electrode line.

20. The liquid crystal display of claim 19, wherein the electrode member is connected to the pixel electrode.

21. The liquid crystal display of claim 14, wherein the pixel electrode includes a first sub-pixel electrode and a second sub-pixel electrode separated from each other.

22. The liquid crystal display of claim 21, wherein the voltage of the first sub-pixel electrode is different from the voltage of the second sub-pixel electrode.

23. The liquid crystal display of claim 22, wherein the area of the first sub-pixel electrode is different from the area of the second sub-pixel electrode.

24. The liquid crystal display of claim 22, wherein different voltages of the first and second sub-pixel electrodes are generated from one image data.

25. The liquid crystal display of claim 24, further comprising:
    a first thin film transistor connected to the first sub-pixel electrode; and
    a second thin film transistor connected to the second sub-pixel electrode.

26. The liquid crystal display of claim 25, wherein the first and second thin film transistors are connected to different gate lines or different data lines.

27. The liquid crystal display of claim 13, further comprising an organic insulating layer formed between the pixel electrode and the data line.

28. The liquid crystal display of claim 17, wherein the concave portion extends in a opposite direction to the oblique side with respect to the central side.

29. The liquid crystal display of claim 17, wherein the concave portion is overlapped with the storage electrode line.

30. The liquid crystal display of claim 17, wherein the concave portion comprises a first concave portion and a second concave portion which are symmetrically disposed to each other with respect to the central side.

31. The liquid crystal display of claim 30, further comprising an electrode member overlapping the storage electrode line,
    wherein the electrode member is connected to the pixel electrode through a contact hole which is disposed between the first concave portion and the second concave portion.

32. The liquid crystal display of claim 4, wherein the blocking member overlaps the second sub-pixel electrode.

33. The liquid crystal display of claim 13, wherein the pixel electrode has a cutout including at least one oblique side which meets the storage electrode line and forms oblique angles to the gate line and the data line, and a central side overlapping the storage electrode line and neighboring the oblique side.

34. The liquid crystal display of claim 4, wherein the first blocking member and the second blocking member are symmetrical with respect to the storage electrode line.

35. The liquid crystal display of claim 34, wherein the first blocking member is protruded upward and the second blocking member is protruded downward.

36. The liquid crystal display of claim 4, wherein the blocking member further includes a third blocking member and a fourth blocking member extended in the same direction.

37. The liquid crystal display of claim 36, wherein the third blocking member and the fourth blocking member overlaps the first sub-pixel electrode.

38. The liquid crystal display of claim 4, wherein the first blocking member and the second blocking member overlaps the first sub-pixel electrode and the second sub-pixel electrode.

39. The liquid crystal display of claim 11, wherein the blocking member connected to the storage electrode line is supplied with a common voltage applied to the common electrode.

40. The liquid crystal display of claim 1, wherein the blocking member decreases a parasitic capacitance generated between the first and the second data lines, and the pixel electrode.

* * * * *